US012131693B2

(12) United States Patent
Ghaemi et al.

(10) Patent No.: US 12,131,693 B2
(45) Date of Patent: Oct. 29, 2024

(54) ELECTRONIC DEVICE WITH OPTICALLY PELLUCID ELECTRICAL CONDUCTOR AND SYSTEMS AND METHODS FOR COMPENSATING FOR THE SAME

(71) Applicant: Motorola Mobility LLC, Chicago, IL (US)

(72) Inventors: Kasra Ghaemi, Chicago, IL (US); Eric Krenz, Crystal Lake, IL (US); Ye Yang, Prior Lake, MN (US)

(73) Assignee: Motorola Mobility LLC, Chicago, IL (US)

( * ) Notice: Subject to any disclaimer, the term of this patent is extended or adjusted under 35 U.S.C. 154(b) by 341 days.

(21) Appl. No.: 16/379,544

(22) Filed: Apr. 9, 2019

(65) Prior Publication Data

US 2020/0329218 A1 Oct. 15, 2020

(51) Int. Cl.
*G09G 3/3225* (2016.01)

(52) U.S. Cl.
CPC ... *G09G 3/3225* (2013.01); *G09G 2300/0426* (2013.01); *G09G 2320/0233* (2013.01); *G09G 2340/14* (2013.01)

(58) Field of Classification Search
CPC ............... G09G 3/3208; G09G 3/3225; G09G 2320/0233; G09G 2340/14; G06F 3/044; G06F 3/013; G06F 3/045; G06F 3/0412; H01L 27/3232; H01L 51/5284; H01L 27/323; H01Q 1/44; H01Q 1/2283; H01Q 1/243; H04N 9/312; G03B 21/2006
See application file for complete search history.

(56) References Cited

U.S. PATENT DOCUMENTS

| | | | | |
|---|---|---|---|---|
| 7,639,849 B2 * | 12/2009 | Kimpe | G09G 3/20 | 382/128 |
| 2009/0009710 A1 * | 1/2009 | Nirmal | G02F 1/13718 | 349/176 |
| 2009/0046072 A1 * | 2/2009 | Emig | G06F 3/044 | 345/173 |
| 2009/0244413 A1 * | 10/2009 | Ishikawa | H01L 27/3232 | 349/12 |

(Continued)

OTHER PUBLICATIONS

Huang et al, "Realisation of printed-on-display antenna for mobile terminals", Electronics Letters, vol. 38, No. 20, Sep. 26, 2002. ( Year: 2002).*

(Continued)

*Primary Examiner* — Julie Anne Watko
(74) *Attorney, Agent, or Firm* — Philip H. Burrus, IV

(57) ABSTRACT

An electronic device includes at least one optically transparent substrate defining an optical transmission area and a display having an array of pixel structures each including a plurality of electroluminescent elements selectively operable to project light through the optical transmission area. An optically pellucid electrical conductor is coupled to the optically transparent substrate at a first subarea of the optical transmission area. One or more processors cause a first set of pixel structures to project light through the first subarea with a first luminous intensity and a second set of pixel structures to project other light through a second subarea of the optical transmission area that is complemental to the first subarea with a second luminous intensity that is different from the first luminous intensity.

20 Claims, 28 Drawing Sheets

(56) References Cited

U.S. PATENT DOCUMENTS

| | | | | |
|---|---|---|---|---|
| 2010/0260460 | A1* | 10/2010 | Harrysson | H01Q 1/243 385/119 |
| 2010/0321325 | A1* | 12/2010 | Springer | H01Q 7/00 345/174 |
| 2011/0310458 | A1* | 12/2011 | Lee | G02F 1/15 359/270 |
| 2012/0091923 | A1* | 4/2012 | Kastner-Jung | F21V 23/0442 315/360 |
| 2014/0104157 | A1* | 4/2014 | Burns | H01Q 1/44 345/156 |
| 2014/0132508 | A1* | 5/2014 | Hodge | G06F 3/013 345/156 |
| 2016/0190509 | A1* | 6/2016 | Sato | H01L 51/5284 257/40 |
| 2016/0217731 | A1* | 7/2016 | Joo | G09G 3/3208 |
| 2017/0285403 | A1* | 10/2017 | Dao | G02F 1/13338 |
| 2019/0113609 | A1* | 4/2019 | Baheti | H01Q 1/2283 |

OTHER PUBLICATIONS

Mullins, "Tesla Coil Faraday Cage", https://www.youtube.com/watch?v=x7uCAvEhP1E (Year: 2013).*

Pellucid definition, Oxford English Dictionary, https://www.oed.com/view/Entry/139895?redirectedFrom=pellucid#eid (Year: 2022).*

Definition of "set", Oxford English Dictionary online (www.oed.com). (Year: 2022).*

Definition of "pellucid", Oxford English Dictionary online (www.oed.com). (Year: 2022).*

"Transparent, Translucent, or Opaque?", Virginia Standards of Learning 5.3(c), Virginia Department of Education. (Year: 2012).*

"Index-matching material", Wikipedia; online; retrieved from https://en.wikipedia.org/wiki/index-mathcing_material on Feb. 26, 2019; unknown publication date.

"Luminous intensity", Wikipedia; Online; retrieved from https://en.wikipedia.org/wiki/Luminous_intensity on Feb. 26, 2019; Unknown publication date.

Hong, Seungman et al., "A Flexible and Transparent Antenna on a Polyimide Substrate for Laptop Computers", Published by IEEE; 2015.

Kirsch, Nicholas J. et al., "Optically Transparent Conductive Polymer RFID Meandering Dipole Antenna", Published in IEEE International Conference on RFID in 2009.

Kuang, Yang et al., "How to Reflect a Function's Graph", dummies; Online; retrieved at https://www.dummies.com/education/math/calculus/how-to-refect-a-functions-graph/ ; unknown publication date; viewed on Feb. 26, 2019.

Song, Hyok Jae et al., "A method for Improving the Efficiency of Transparent Film Antennas", Published by IEEE; Antennas and Wireless Propagation Letters, vol. 7; 2008.

Yasin, Tursunjan et al., "A Comparative Study on Two Types of Transparent Patch Atennas", Published by IEEE for 2011 XXXth URSI General Assembly and Scientific Symposium; Oct. 20, 2011.

* cited by examiner

1301

An electronic device comprises at least one optically transparent substrate defining an optical transmission area. The electronic device comprises a display comprising an array of pixel structures each comprising a plurality of electroluminescent elements selectively operable to project light through the optical transmission area. The electronic device comprises an optically pellucid electrical conductor coupled to the at least one optically transparent substrate at a first subarea of the optical transmission area. The electronic device comprises one or more processors operable with the display. The one or more processors cause a first set of pixel structures projecting light through the first subarea to project the light with a first luminous intensity. The one or more processors cause a second set of pixel structures projecting other light through a second subarea of the optical transmission area that is complemental to the first subarea to project the other light with a second luminous intensity. The first luminous intensity is different from the second luminous intensity.

*FIG. 13A*

1305

Each electroluminescent element of 1304 comprises at least one green electroluminescent element, a red electroluminescent element, and a blue electroluminescent element. The one or more processors causing green electroluminescent elements of the first set of pixel structures and blue electroluminescent elements of the first set of pixel structures to project more light than green electroluminescent elements of the second set of pixel structures and blue electroluminescent elements of the second set of pixel structures.

*FIG. 13E*

1309

The electronic device of 1301 further comprises one or more sensors operable with the one or more processors. The one or more sensors determine a location of a person gazing toward the display. The one or more processors cause a third set of pixel structures to project the light through the first subarea along an axis defined between the third set of pixel structures and the location with at least the first luminous intensity, while a fourth set of pixel structures project the other light through the second subarea along the axis with at least the second luminous intensity.

*FIG. 13I*

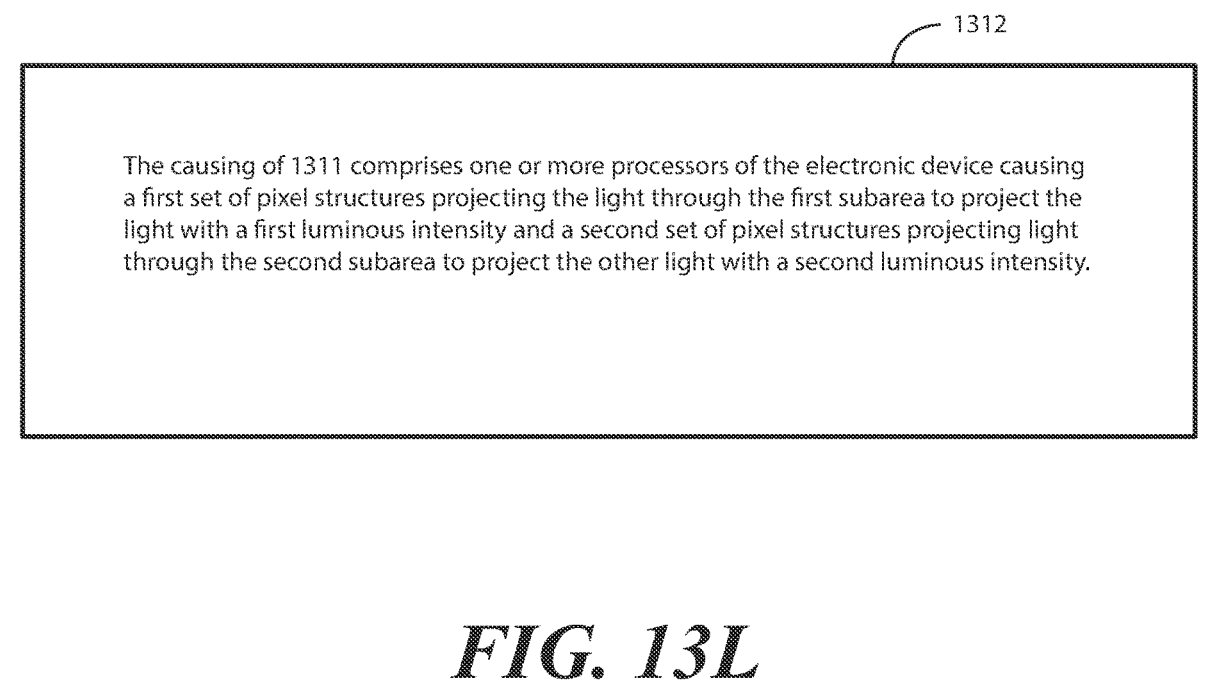

1312

The causing of 1311 comprises one or more processors of the electronic device causing a first set of pixel structures projecting the light through the first subarea to project the light with a first luminous intensity and a second set of pixel structures projecting light through the second subarea to project the other light with a second luminous intensity.

*FIG. 13L*

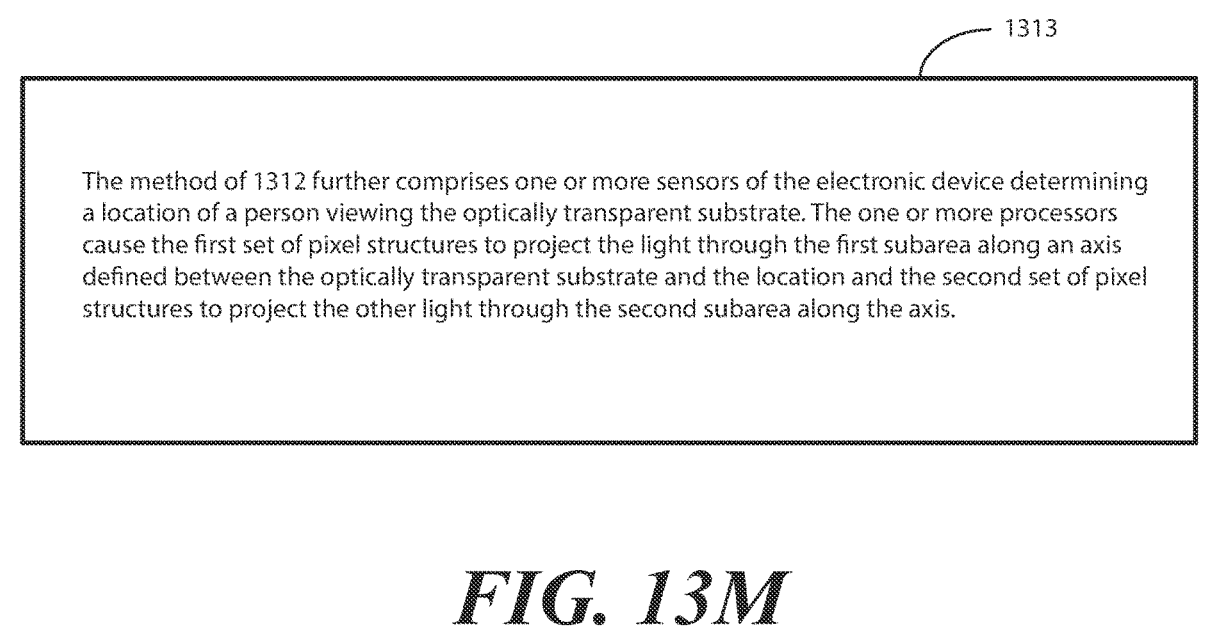

1313

The method of 1312 further comprises one or more sensors of the electronic device determining a location of a person viewing the optically transparent substrate. The one or more processors cause the first set of pixel structures to project the light through the first subarea along an axis defined between the optically transparent substrate and the location and the second set of pixel structures to project the other light through the second subarea along the axis.

FIG. 13M

1314

The causing of 1311 comprises coupling a reflective substrate to the optically transparent substrate. The reflective substrate comprises a first reflective material defining a first reflective coefficient disposed at regions from which the light reflects through the first subarea and a second reflective material defining a second reflective coefficient disposed at regions from which the other light reflects through the second subarea.

*FIG. 13N*

1316

An electronic device comprises an optically transparent substrate. The electronic device comprises an optically pellucid electrical conductor coupled to the optically transparent substrate at a first subarea of the optically transparent substrate. The electronic device comprises a housing abutting the optically transparent substrate. The housing comprises a first reflective material reflecting light through the first subarea and a second reflective material reflecting other light through a second subarea of the optically transparent substrate that is complemental to the first subarea. The first reflective material is more reflective than the second reflective material.

*FIG. 13P*

1318

The first color of light of 1317 comprises more green light and more blue light than the second color of light.

*FIG. 13R*

1319

The optically pellucid electrical conductor of 1316 defines a light transmission function of light wavelength. The first reflective material of 1316 defines a light reflection function of the light wavelength. The light absorption function defines a horizontal reflection function of the light reflection function.

*FIG. 13S*

ELECTRONIC DEVICE WITH OPTICALLY PELLUCID ELECTRICAL CONDUCTOR AND SYSTEMS AND METHODS FOR COMPENSATING FOR THE SAME

BACKGROUND

Technical Field

This disclosure relates generally to electronic devices, and more particularly to electronic devices including optically transparent substrates.

Background Art

Portable electronic devices, such as smartphones and tablet computers, are ubiquitous in modern society. Using a mobile telephone as an example, these devices were once used only for making voice calls while "on the go." Today, however, "smart" devices include powerful processors that allow users to perform activities such as sending and receiving text and multimedia communications, executing and managing financial transactions, consuming video or other multimedia content, and connecting with servers across the Internet.

There is a tension in the design of electronic devices between maximizing the size of a display upon which information is presented and keeping the overall size of the device such that it can economically and reasonably be held in the hand of a user. This is especially true with reference to smaller, handheld devices such as smartphones, media players, and gaming devices. It would be advantageous to have an improved electronic device that allowed for a larger display, yet without sacrificing features and functionality.

Figure 1:
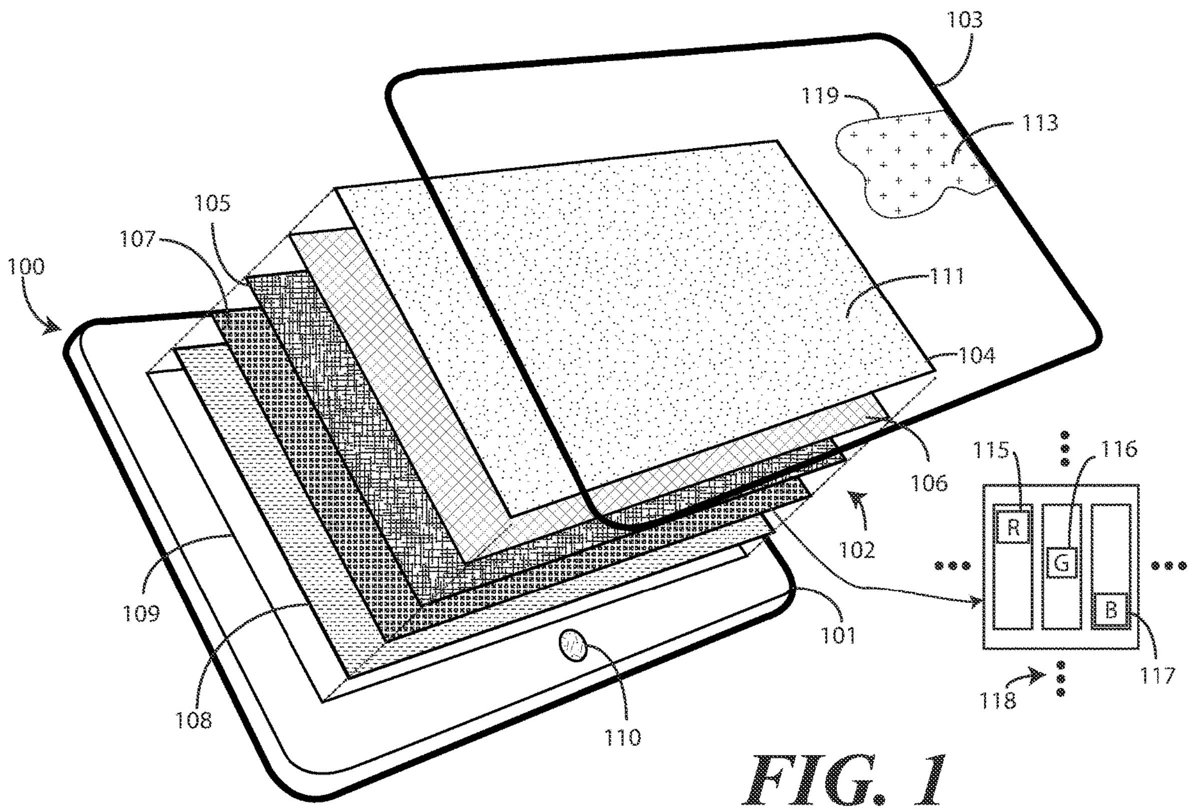
FIG. 1 illustrates an exploded diagram of one explanatory electronic device having a display in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that some of the embodiments described below reside primarily in combinations of method steps and apparatus components related to causing a first set of pixel structures to project light through an optically transparent substrate to project the light with a first luminous intensity, while a second set of pixel structures projects other light through both the optically transparent substrate and an optically pellucid electrical conductor with a second luminous intensity. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more processors to implement, in conjunction with certain non-processor circuits, some, most, or all of the functions of a display operable project light with different luminous intensities, and optionally different colors, through different parts of an optically transparent substrate as described herein. The non-processor circuits may include, but are not limited to, a display driver, optical switches, light emitting devices, clock circuits, power source circuits, and user input devices. As such, these functions may be interpreted as steps of a method to cause more—and optionally differently colored—light through portions of an optically transparent substrate coupled to an optically pellucid electrical conductor than through other portions of the optically transparent substrate where no optically pellucid electrical conductor is present. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within 10 percent, in another embodiment within 5 percent, in another embodiment within 1 percent, and in another embodiment within 0.5 percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide for an electronic device having at least one optically transparent substrate. In one or more embodiments, an optically pellucid electrical conductor is coupled to a portion of the optically transparent substrate, with the area to which the optically pellucid electrical conductor is coupled to the optically transparent substrate defining a subarea of the optically transparent substrate.

In one or more embodiments, one or more processors are operable an array of pixel structures that comprise electroluminescent elements that are selectively operable to project light through the optically transparent substrate. In one or more embodiments, the one or more processors compensate for the fact that the optically pellucid electrical conductor has a reduced light transmission function compared to the optically transparent substrate by causing a first set of pixel structures projecting light through only the optically transparent substrate to project that light with a first luminous intensity, while a second set of pixel structures projects other light through both the optically transparent substrate and the optically pellucid electrical conductor with a second luminous intensity, where the first luminous intensity is different from the second luminous intensity. In one or more embodiments, the second luminous intensity is greater than the first luminous intensity.

Advantageously, the one or more processors can cause more light to pass through the subarea where the optically pellucid electrical conductor is disposed than through other portions of the optically transparent substrate where the optically pellucid electrical conductor is absent. Since the optically pellucid electrical conductor absorbs more light than does the optically transparent substrate, this compensation reduces or eliminates the visibility of the optically pellucid electrical conductor. Since the optically pellucid electrical conductor becomes completely or nearly invisible to the user, embodiments of the disclosure allow a designer to place electrical components, including antennas, switches, signal conductors, and so forth, directly atop a display. This frees up other areas in which such electrical components would be placed, thereby allowing the overall display to be larger without compromising device features or functionality.

Embodiments of the disclosure are not limited to optically transparent substrates that are used atop displays, however. In another embodiment, such as where an optically transparent substrate is used for the rear surface of the electronic device, embodiments of the disclosure provide different compensation mechanisms to reduce or eliminate the visibility of the optically pellucid electrical conductor.

Illustrating by example, in another embodiment an electronic device includes an optically transparent substrate disposed along a surface of the electronic device. An optically pellucid electrical conductor is coupled to the optically transparent substrate at a first subarea, with portions of the optically transparent substrate where the optically pellucid electrical conductor is not coupled to the optically transparent substrate defining a second subarea of the optically transparent substrate that is complementary to the first subarea.

In one or more embodiments, a housing is coupled to or otherwise abuts the optically transparent substrate. In one or more embodiments, the housing comprises a first reflective material reflecting light through the first subarea, i.e., through both the optically transparent substrate and the optically pellucid electrical conductor. In one or more embodiments, the housing comprises a second reflective material reflecting other light through the second subarea of the optically transparent substrate, i.e., through only the optically transparent substrate. As such, in one or more embodiments, the second subarea is complemental to the first subarea, with "complemental" taking the ordinary English meaning of referring to members of a set that are not members of a given subset, e.g., the second subarea comprising portions of the optically transparent substrate that are not portions of the first subarea.

In one or more embodiments, the first reflective material is more reflective than the second reflective material. Accordingly, more light is reflected through the first subarea than the second subarea. In one or more embodiments, the first reflective material also reflects a different color than does the second reflective material. Accordingly, a different color of light is reflected through the first subarea than through the second subarea. By changing the luminous intensity and/or color of light reflecting through both the optically transparent substrate and the optically pellucid electrical conductor compared with the optically transparent substrate alone, the optical spectrum observed by the human eye at the first subarea is nearly or exactly identical to that observed at the second subarea. This causes the optically pellucid electrical conductor to look substantially or completely invisible.

Embodiments of the disclosure contemplate that large electrical conductors, such as antennas, are traditionally placed at the top, bottom, or sides of electronic devices adjacent to a display due to the fact that these conductors are typically manufactured from opaque metals. This not only requires the display to be smaller than the major faces of the electronic device, but can also cause other cosmetic issues such as large opaque bezels surrounding or intruding upon the visible display area. Moreover, when non-display surfaces of electronic devices, such as the rear major face, are constructed using an optically transparent substrate, similar cosmetic issues can occur, as portions of the optically transparent substrate where the electrical conductor is placed can look darker and/or off color compared to portions where the optically pellucid electrical conductor is absent.

While optically pellucid electrical conductors, such as indium-tin oxide (In.sub.2 O.sub.3-SnO.sub.2), can be used to mitigate such effects, embodiments of the disclosure contemplate that the problem remains due to the fact that the optical transmission characteristics of optically pellucid electrical conductors such as indium-tin-oxide are not perfect. While an optically transparent substrate may transmit ninety percent or more light at substantially all wavelengths, an optically pellucid electrical conductor such as indium-tin-oxide may transmit only eighty percent of the light at certain wavelengths. Moreover, the amount of light transmitted by an optically pellucid electrical conductor may vary as a function of wavelength, with some colors being absorbed more than other colors and so forth.

Embodiments of the disclosure advantageously solve this problem by allowing electrical conductors constructed in the form of optically pellucid electrical conductors to be coupled to optically transparent substrates directly above a display or other major surface of an electronic device. Since the luminous intensity of light passing through both the optically transparent substrate and the optically pellucid electrical conductor will be slightly less than that passing through only the optically transparent substrate, embodiments of the disclosure compensate for the optical attenuation of the optically pellucid electrical conductor by either changing the amount and/or of light emitted from electroluminescent elements of a display beneath the optically pellucid electrical conductor or by providing a reflective material beneath the optically pellucid electrical conductor having a different reflection and/or color coefficient to cause the light being emitted through both the optically pellucid electrical conductor and the optically transparent substrate to have substantially or actually the same color and luminous intensity as that passing through the optically transparent substrate alone. Advantageously, a user viewing the optically transparent substrate to which the optically pellucid electrical conductor is coupled will not notice the presence of the optically pellucid electrical conductor.

Turning now to FIG. 1, illustrated therein is one explanatory electronic device 100 in accordance with one or more embodiments of the disclosure. The explanatory electronic device 100 of FIG. 1 is shown as a tablet computer for illustrative purposes. However, it will be obvious to those of ordinary skill in the art having the benefit of this disclosure that other electronic devices may be substituted for the explanatory tablet computer of FIG. 1. For example, the electronic device 100 may be configured as a palm-top computer, a smartphone, a gaming device, wearable computer, a media player, or other device.

This illustrative electronic device 100 is shown in FIG. 1 in a partially exploded view so that various components can more clearly be seen. The electronic device 100 includes a housing 101, a display 102, and a fascia, which is shown here as being an optically transparent substrate 103. Starting from the top, a fascia is provided. In this illustrative embodiment, the fascia defines a major face of the housing 101 disposed above the display 102.

In one or more embodiments, the fascia comprises an optically transparent substrate 103. Illustrating by example, in one or more embodiments the optically transparent substrate 103 may be manufactured from an optically transparent material such as glass, soda glass, reinforced glass, plastic, or a thin film sheet. In one or more embodiments the optically transparent substrate 103 functions as a fascia by defining a cover for a major surface of the housing 101, which may or may not be detachable. In one or more embodiments the optically transparent substrate 103 is optically transparent, in that light can pass through the optically transparent substrate 103 so that objects behind the optically transparent substrate 103 can be distinctly seen. In one or more embodiments, the optically transparent substrate 103 can comprise reinforced glass strengthened by a process such as a chemical or heat treatment. The optically transparent substrate 103 may also include a ultra-violet barrier. Such a barrier is useful both in improving the visibility of display 102 and in protecting internal components of the electronic device 100.

Printing may be desired on the front face of the optically transparent substrate 103 for various reasons. For example, a subtle textural printing or overlay printing may be desirable to provide a translucent matte finish atop the optically transparent substrate 103. Such a finish is useful to prevent cosmetic blemishing from sharp objects or fingerprints.

In one or more embodiments, an optically pellucid electrical conductor 113 is coupled to the optically transparent substrate 103. The optically pellucid electrical conductor 113 can define any of a number of electrical conductors or electrical conductor components. Illustrating by example, in one embodiment the optically pellucid electrical conductor 113 comprises an antenna. In another embodiment, the optically pellucid electrical conductor 113 comprises one or more signal conductors. In still other embodiments, the optically pellucid electrical conductor 113 comprises one or more switches. In still other embodiments the optically pellucid electrical conductor 113 defines a user interface component, such as a capacitive sensor. Still other examples of conductors that can be defined by the optically pellucid electrical conductor 113 will be obvious to those of ordinary skill in the art having the benefit of this disclosure.

The portion of the optically transparent substrate 103 to which the optically pellucid electrical conductor 113 is coupled delineates different, complemental subareas of the optically transparent substrate 103 in one or more embodiments. Illustrating by example, portions of the optically transparent substrate 103 to which the optically pellucid electrical conductor 113 is coupled define a first subarea of the optically transparent substrate 103 in one embodiment. By contrast, portions of the optically transparent substrate 103 to which the optically pellucid electrical conductor 113 is not coupled, i.e., portions of the outer surface of the optically transparent substrate 103 where the optically pellucid electrical conductor 113 is absent, define a second subarea that is complemental to the first subarea. In the illustrative embodiment of FIG. 1, the perimeter 119 of the optically pellucid electrical conductor 113 defines the common boundary separating the first subarea of the outer surface of the optically transparent substrate 103 and the second, complemental subarea of the outer surface of the optically transparent substrate 103.

Beneath the optically transparent substrate 103 is disposed the display 102. The display 102 is supported by the housing 101 of the electronic device 100. In this illustrative embodiment, the display 102 is disposed between the housing 101 and the optically transparent substrate 103. In one or more embodiments, the display 102 comprises a plurality of pixel structures, where each pixel structure comprises a plurality of electroluminescent elements.

For illustrative purposes, the display 102 of FIG. 1 will be described as an active matrix organic light emitting diode (AMOLED) display, and more particularly, a touch-sensitive AMOLE display. The use of AMOLED displays with embodiments of the disclosure is advantageous in that they generally use less power than other displays, have a thinner physical profile than other displays, offer higher contrast ratios than other displays, and provide overall better display quality. Touch sensitivity allows the AMOLED display to function as a user input device.

However, it should be noted that the use of an AMOLED display is optional. Embodiments of the disclosure work equally well with other display types. For example, in another embodiment the display 102 comprises a traditional organic light emitting diode (OLED) display. In still other embodiments, the display 102 comprises a liquid crystal display (LCD). Other displays suitable for use with embodiments of the disclosure will be obvious to those of ordinary skill in the art having the benefit of this disclosure.

In one embodiment, the display 102 comprises a plurality of layers. Beginning at the top, an optional polarizer 104 is disposed beneath the optically transparent substrate 103. In this illustrative embodiment, the optically pellucid electrical conductor 113 and the polarizer 104 are positioned on opposite sides of the optically pellucid electrical conductor 103. Light propagating from the environment through the optically transparent substrate 103 passes through the polarizer 104 and is accordingly polarized. In one or more embodiments, the polarizer 104 is about fifty micrometers in thickness. The polarizer 104 can optionally be coupled to the fascia 103 with an optically transparent adhesive in one or more embodiments.

Beneath the polarizer 104 is a first substrate 105. In one or more embodiments, the first substrate 105 is optically transparent. The first substrate 105 has a thickness of about 100 micrometers in one embodiment.

In one or more embodiments the display 102 is optionally a touch-sensitive display. Illustrating by example, in one or more embodiments the first substrate 105 has an electrode structure 106 disposed thereon. In one or more embodiments, the electrode structure 106 comprises one or more optically transparent electrodes. These optically transparent electrodes can be manufactured by depositing indium-tin-oxide, often in the shape of pixels, to apply selective electric fields to the pixels of the organic light emitting diode layer 107 disposed beneath the first substrate 105, thereby presenting images to a user on the display 102. One or more processors (shown below in FIG. 2) can be operable with the electrode structure to cause the electroluminescent elements of the organic light emitting diode layer 107 to present images, text, and other indicia along the surface of the display 102.

Beneath the first substrate 105 is disposed an organic light emitting diode layer 107. In one or more embodiments, the organic light emitting diode layer 107 comprises one or more pixel structures, with one illustrative pixel structure 114 being shown adjacent to the display 102 in FIG. 1. In one or more embodiments, these pixel structures 114 are arranged in an array, with each comprising a plurality of electroluminescent elements 115,116,117. In this illustrative example, each electroluminescent element 115,116,117 comprises an organic light emitting diode.

As shown in this illustrative example, in one or more embodiments each pixel structure 114 comprises three electroluminescent elements 115,116,117. In another embodiment, each pixel structure 114 comprises four electroluminescent elements. Other numbers of electroluminescent elements defining a pixel structure will be obvious to those of ordinary skill in the art having the benefit of this disclosure.

The electroluminescent elements 115,116,117, when stimulated by an electric field, emit light through carrier injection and recombination. When a cathode and anode apply an electric field to the electroluminescent elements 115,116,117, the electric field causes electrons and holes to be injected into an electron transport layer and a hole transport layer of the electroluminescent elements 115,116, 117. The electrons and holes migrate to a light-emitting layer and meet to create "excitons" that emit visible light through radiative relaxation.

In this illustrative embodiment, each pixel structure 114 comprises a first electroluminescent element 115, a second electroluminescent element 116, and a third electroluminescent element 117. In one embodiment, the first electroluminescent element 115 emits a first color of light, while the second electroluminescent element 116 emits a second color of light. A third electroluminescent element 117 emits a third color of light. The three colors combine to create a desired color for the presentation of images.

In one embodiment, the first electroluminescent element 115 comprises a red electroluminescent element, while the second electroluminescent element 116 comprises a green electroluminescent element. The third electroluminescent element 117 then comprises a blue electroluminescent element. In some embodiments the third electroluminescent element 117 may be larger than the first electroluminescent element 115 and the second electroluminescent element 116 because blue electroluminescent elements sometimes have a shorter lifespan than do red or green electroluminescent elements.

The pixel structure 114 of FIG. 1 is suitable for use in an OLED display. Where the organic light emitting diode display is a touch-sensitive AMOLED, additional components can be operable with the pixel structure 114. These additional components can include one or more thin film transistors and one or more capacitors for energy storage. In one or more embodiments, each pixel structure 114 has an identical circuit structure and includes a driver circuit that includes six thin film transistors and two energy storage capacitors. The energy storage capacitors store a charge sufficient to actuate the electroluminescent elements 115, 116,117 of the pixel structure 114, while the thin film transistors regulate when the energy storage capacitors charge and discharge.

In one embodiment, the one or more pixel structures 114 are arranged along the first substrate 105. In another embodiment, the one or more pixel structures 114 are arranged along a second substrate 108, which is disposed beneath the first substrate 105. Other configurations will be obvious to those of ordinary skill in the art having the benefit of this disclosure.

In one or more embodiments, the pixel structures 114 are arranged in an array 118 on one of the first substrate 105 or the second substrate 108. In one or more embodiments, the array 118 of pixel structures has a pitch of between 60 and 100 micrometers.

Beneath the organic light emitting diode layer 107 is a second substrate 108. In one embodiment, the second substrate 108 has a thickness of about 100 micrometers. In one embodiment, the second substrate 108 includes an electrode structure 109 deposited thereon. In one embodiment, the electrode structure 109 comprises a plurality of transistors deposited along the second substrate 108 as a thin film transistor layer. The thin film transistor layer can be deposited directly upon the second substrate 108 in one embodiment. Alternatively, a lamination adhesive can couple the thin film transistor layer to the second substrate 108.

Features can be incorporated into the housing 101 beneath the optically transparent substrate 103. Examples of such features include a fingerprint reader 110 or touch sensitive surface. Other examples of such features include a microphone or speaker port. Still others will be obvious to those of ordinary skill in the art having the benefit of this disclosure.

Figure 2:
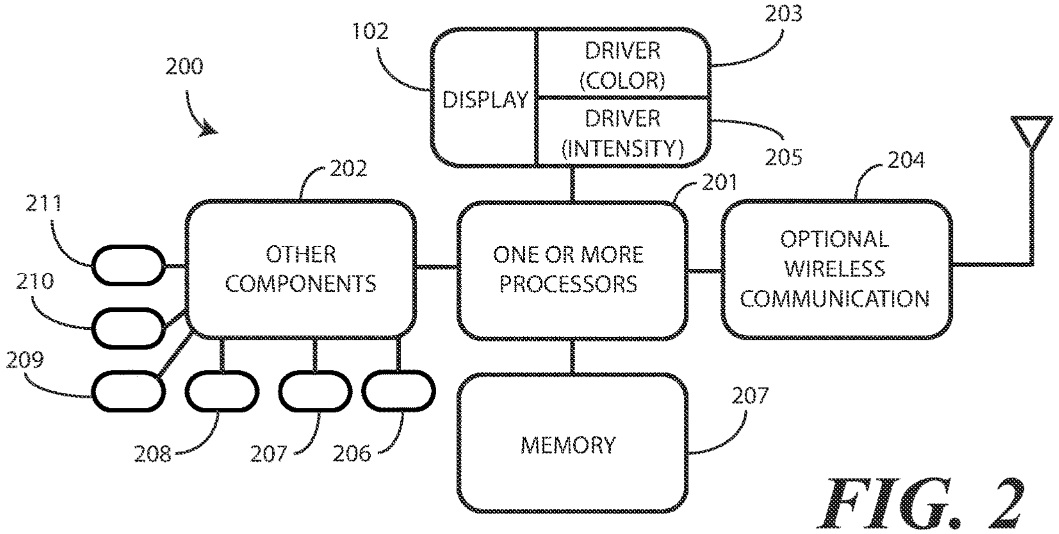
FIG. 2 illustrates a schematic block diagram of one explanatory electronic device having a display in accordance with one or more embodiments of the disclosure.

Turning now to FIG. 2, illustrated therein is a schematic block diagram 200 of an explanatory electronic device configured in accordance with one or more embodiments of the disclosure. In one embodiment, the electronic device includes one or more processors 201. In one or more embodiments the one or more processors 201 are operable with the display 102 and other components 202 of the electronic device.

The one or more processors 201 can include a microprocessor, a group of processing components, one or more ASICs, programmable logic, or other type of processing device. The one or more processors 201 can be operable with the various components of the electronic devices configured in accordance with embodiments of the disclosure. The one or more processors 201 can be configured to process and execute executable software code to perform the various functions of the electronic devices configured in accordance with embodiments of the disclosure.

A storage device, such as memory 207, can optionally store the executable software code used by the one or more processors 201 during operation. The memory 207 may include either or both static and dynamic memory components, may be used for storing both embedded code and user data. The software code can embody program instructions and methods to operate the various functions of the electronic device devices configured in accordance with embodiments of the disclosure, and also to execute software or firmware applications and modules. The one or more processors 201 can execute this software or firmware, and/or interact with modules, to provide device functionality.

In this illustrative embodiment, the schematic block diagram 200 also includes an optional communication circuit 204 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks.

The communication circuit 204 may also utilize wireless technology for communication, such as, but are not limited to, peer-to-peer or ad hoc communications such as HomeRF, Bluetooth and IEEE 802.11 (a, b, g or n); and other forms of wireless communication such as infrared technology. The communication circuit 204 can include wireless communication circuitry, one of a receiver, a transmitter, or transceiver, and one or more antennas.

In one or more embodiments, the one or more processors 201 cause elective actuation of the pixel structures (114) of the display 102 through one or more display drivers 203, 205. The display drivers 203,205 can cause the electroluminescent elements (115,116,117) of the pixel structures (114) to selectively emit light with different luminous intensity and different colors. For simplicity, the display drivers 203,205 of FIG. 2 are illustrated as a color display driver 203 and a luminous intensity display driver 205. However, it should be understood that the display drivers 203,205 can be configured as a single component capable of causing the electroluminescent elements (115,116,117) of the pixel structures (114) to emit outputs with differing luminous intensity and color as well. Additionally, the display drivers 203,205 can be integrated into the one or more processors 201 in other embodiments. Other configurations by which the one or more processors 201 cause various pixel structured to emit or project light with a desired color and luminous intensity will be obvious to those of ordinary skill in the art having the benefit of this disclosure.

The one or more processors 201 can also be operable with other components 202. The other components 202 can include an acoustic detector, such as a microphone. The other components 202 can also include one or more proximity sensors to detect the presence of nearby objects. The other components 202 may include video input components such as optical sensors, mechanical input components such as buttons, touch pad sensors, touch screen sensors, capacitive sensors, motion sensors, and switches. Similarly, the other components 202 can include output components such as video, audio, and/or mechanical outputs. Other examples of output components include audio output components such as speaker ports or other alarms and/or buzzers and/or a mechanical output component such as vibrating or motion-based mechanisms. The other components 202 may further include an accelerometer to show vertical orientation, constant tilt and/or whether the device is stationary.

The one or more processors 201 can be responsible for performing the primary functions of the electronic devices configured in accordance with one or more embodiments of the disclosure. For example, in one embodiment the one or more processors 201 comprise one or more circuits operable with one or more user interface devices, which can include the display 102, to present presentation information to a user. The executable software code used by the one or more processors 201 can be configured as one or more modules that are operable with the one or more processors 201. Such modules can store instructions, control algorithms, and so forth.

In some embodiments, higher function features can be included as well. Illustrating by example, as will be described below some embodiments include one or more sensors operable with the one or more processors 201 that determine a location of a person gazing toward the display 102 so that light can be projected through a optically pellucid electrical conductor (113) at an angle, rather than with an orthogonal angle of incidence to further reduce the visibility of the optically pellucid electrical conductor (113) when the person is viewing the display 102 at an angle. Accordingly, some of these optional sensors will now be described. It should be noted that these higher function sensors can be used alone or in combination, depending upon the application.

In one or more embodiments, the one or more processors 201 are operable with a gaze detector 206. The gaze detector 206 can comprise sensors for detecting the user's gaze point. The gaze detector 206 can optionally include sensors for detecting the alignment of a user's head in three-dimensional space relative to the electronic device (100). Electronic signals can then be processed for computing the direction of user's gaze in three-dimensional space relative to the electronic device (100).

In one or more embodiments, the gaze detector 206 can further be configured to detect a gaze cone corresponding to the detected gaze direction, which is a field of view within which the user may easily see without diverting their eyes or head from the detected gaze direction. The gaze detector 206 can be configured to alternately estimate gaze direction by inputting images representing a photograph of a selected area near or around the eyes. It will be clear to those of ordinary skill in the art having the benefit of this disclosure that these techniques are explanatory only, as other modes of detecting gaze direction can be substituted in the gaze detector 206 of FIG. 2.

The one or more processors 201 may also be operable with a face analyzer 208. The face analyzer 208 can include its own image/gaze detection-processing engine as well. The image/gaze detection-processing engine can process information to detect a user's gaze point. The image/gaze detection-processing engine can optionally also work with the depth scans to detect an alignment of a user's head in three-dimensional space. Electronic signals can then be delivered from an optional imager 209 or depth imager 210 for computing the direction of user's gaze in three-dimensional space. The image/gaze detection-processing engine can further be configured to detect a gaze cone corresponding to the detected gaze direction, which is a field of view within which the user may easily see without diverting their eyes or head from the detected gaze direction. The image/gaze detection-processing engine can be configured to alternately estimate gaze direction by inputting images representing a photograph of a selected area near or around the eyes. It can also be valuable to determine if the user wants to be authenticated by looking directly at device. The image/gaze detection-processing engine can determine not only a gazing cone but also if an eye is looking in a particular direction to confirm user intent to be authenticated.

To help determine at what angle a user is viewing the display 102, the one or more processors 201 can also be operable with an orientation detector 211. One or more motion detectors can be configured to function as the orientation detector 211. The orientation detector 211 can determine an orientation and/or movement of the electronic device (100) in three-dimensional space. Illustrating by example, the orientation detector 211 can include an accelerometer, gyroscopes, or other device to detect device orientation and/or motion of the electronic device (100). Using an accelerometer as an example, an accelerometer can be included to detect motion of the electronic device (100). Additionally, the accelerometer can be used to sense some of the gestures of the user, such as one talking with their hands, running, or walking.

The orientation detector 211 can determine the spatial orientation of an electronic device (100) in three-dimensional space by, for example, detecting a gravitational direction. In addition to, or instead of, an accelerometer, an electronic compass can be included to detect the spatial orientation of the electronic device relative to the earth's magnetic field. Similarly, one or more gyroscopes can be included to detect rotational orientation of the electronic device (100).

It is to be understood that FIG. 2 is provided for illustrative purposes only and for illustrating components of explanatory electronic devices configured in accordance with one or more embodiments of the disclosure, and is not intended to be a complete schematic diagram of the various components required for an electronic device. Therefore, other electronic devices in accordance with embodiments of the disclosure may include various other components not shown in FIG. 2, or may include a combination of two or more components or a division of a particular component into two or more separate components, and still be within the scope of the present disclosure.

Figure 3:
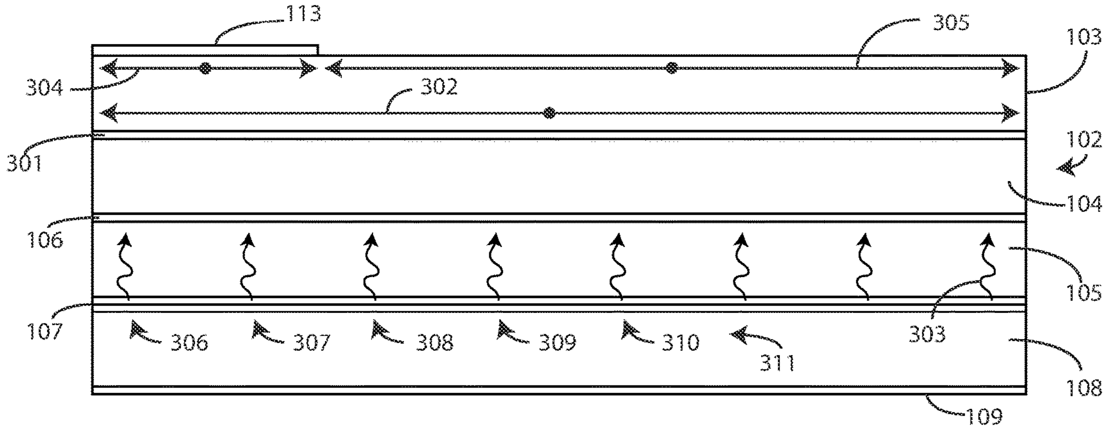
FIG. 3 illustrates a sectional view of one explanatory display in accordance with one or more embodiments of the disclosure.

Turning now to FIG. 3, illustrated therein is a sectional view of the display 102 of FIG. 1. The various layers shown in FIG. 3 include the optically pellucid electrical conductor 113, which is coupled to a portion of a major face of the optically transparent substrate 103 defining a first subarea 304 of an optical transmission area 302 of the optically transparent substrate 103.

Beneath the optically transparent substrate 103 is the display 102. As previously described, in one or more embodiments the display 102 comprises a plurality of layers. These layers include the optional polarizer 104, a first substrate 105, and an electrode structure 106 disposed along the first substrate 105.

An organic light emitting diode layer 107 is then disposed between the first substrate 105 and the second substrate 108. The organic light emitting diode layer 107 comprises an array 311 of pixel structures 306,307,308,309,310. The array 311 of pixel structures 306,307,308,309,310 is shown in FIG. 3 as being selectively operable to project light 303 through the optical transmission area 302 defined by the optically transparent substrate 103. Each of the pixel structures 306,307,308,309,310 can include one or more electroluminescent elements as described above with reference to FIG. 1. In one or more embodiments the electroluminescent elements of pixel structures 306,307,308,309,310 of the array 311 are selectively operable to project light 303 through the optical transmission area 302 of the optically transparent substrate 103, thereby presenting images to a user.

Beneath the organic light emitting diode layer 107 is a second substrate 108. In one embodiment, the second substrate 108 includes an electrode structure 109 deposited thereon. In one embodiment, the electrode structure 109 comprises a plurality of transistors that, in conjunction with the electrode structure 106 disposed along the first substrate 105, can selectively actuate the electroluminescent elements of the array 311 of pixel structures 306,307,308,309,310.

As shown in FIG. 3, in this illustrative embodiment the optically pellucid electrical conductor 113 is coupled to only a portion of the optically transparent substrate 103. As such, the portion of the optically transparent substrate 103 to which the optically pellucid electrical conductor 113 is coupled defines a first subarea 304 of the optical transmission area 302. Along the major surface of the optically transparent substrate 103 to which the optically pellucid electrical conductor 113 is coupled where the optically pellucid electrical conductor 113 is not coupled, then define a second subarea 305 of the optical transmission area 302 of the optically transparent substrate 103.

As shown in FIG. 3, in this embodiment the first subarea 304 is complemental to the second subarea 305 due to the fact that all portions of the first subarea 304 are within the first subarea 304 only, without overlap into the second subarea 305. The same is true with the second subarea 305. All portions of the second subarea 305 are disposed within the second subarea 305 only, without overlap into the first subarea 304. Thus, the first subarea 304 and the second subarea 305 are geometric complements, with the perimeter of the optically pellucid electrical conductor 113 defining a common boundary therebetween.

Embodiments of the disclosure contemplate that the optically pellucid electrical conductor 113, in most if not all cases, will be more optically lossy than will the optically transparent substrate 103 due to its higher electrical conductivity. Using indium-tin-oxide as an example of an optically pellucid electrical conductor 113, in many cases this material can absorb up to ten percent or more light than will soda glass or reinforced glass of the optically transparent substrate 103. This phenomenon is illustrated in the light transmission functions shown in FIG. 4.

Figure 4:
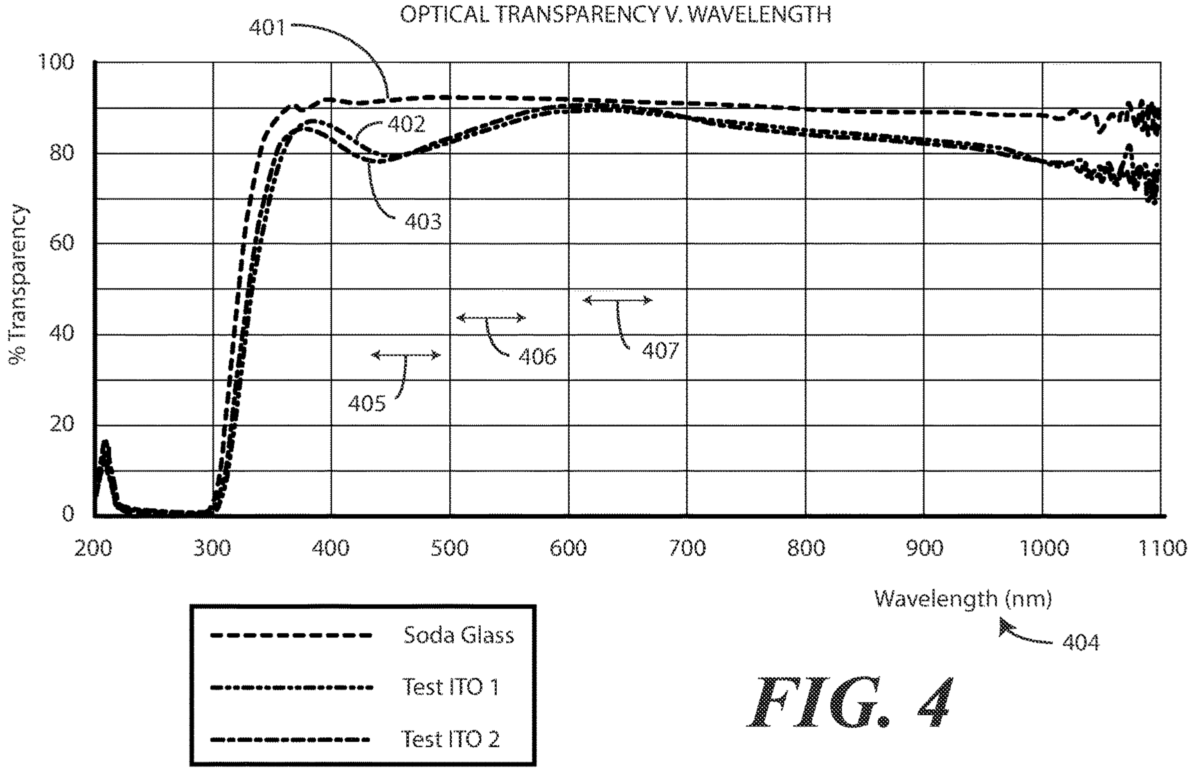
FIG. 4 illustrates one explanatory light transmission function for one illustrative optically transparent substrate and a plurality of optically pellucid electrical conductors configured in accordance with one or more embodiments of the disclosure.

Turning now to FIG. 4, illustrated therein are three light transmission functions 401,402,403 derived from experimental testing. Each light transmission function 401,402, 403 is a function of light wavelength 404. Each light transmission function 401,402,403 demonstrates the amount of light absorbed in a material as a function of light wavelength. Since the light transmission functions 401,402, 403 of FIG. 4 are not flat across the various light wavelengths, it is clear that some wavelengths of light, i.e., some colors of light, will be absorbed more, or less, than other wavelengths of light.

In FIG. 4, the first light transmission function 401 demonstrates the amount of light absorbed in an optically transparent substrate (103) as a function of wavelength. In this example, the optically transparent substrate (103) is soda glass. In this example, the soda glass had a thickness of about 1.1 millimeters. By contrast, the second light transmission function 402 and the third light transmission function 403 demonstrate the amount of light absorbed by a first example and a second example of an optically pellucid electrical conductor (113), respectively, which in this example is indium-tin-oxide.

Those of ordinary skill in the art having the benefit of this disclosure will recognize that blue light 405 generally has a wavelength range of between 450 and 490 nanometers, while green light 406 has a wavelength range of between 520 and 560 nanometers. Red light 407 has a longer wavelength, which is generally between about 635 and 700 nanometers. Those of ordinary skill in the art having the benefit of this disclosure will also understand that red light 407, green light 406, and blue light 405 can be combined to form other colors as well. For example, red light 407 and green light 406 can be combined to create yellow light, which has a wavelength of between 560 and 590 nanometers, and so forth.

By comparing the light transmission functions 401,402, 403, it becomes clear that an optically pellucid electrical conductor (113) generally absorbs more light than does an optically transparent substrate (103). Moreover, it is clear that an optically pellucid electrical conductor (113) can absorb more of one particular color than another. Illustrating by example, in FIG. 4 both optically pellucid electrical conductors absorb roughly ten percent more blue light 405 than does the optically transparent substrate. The optically pellucid electrical conductors absorb five to seven percent more green light 406 than does the optically transparent substrate. The optically pellucid electrical conductors absorb only a few percent more red light 407 than does the optically transparent substrate.

It should be noted that the light transmission functions 401,402,403 of FIG. 4 are illustrative only. The light transmission functions 402,403 of the optically pellucid electrical conductors will change as a function of a variety of factors. Thicker depositions of the optically pellucid electrical conductor, for example, will cause more light to be absorbed than will thinner depositions of the optically pellucid electrical conductor. Similarly, different materials used for the optically pellucid electrical conductor will absorb different amounts of light at different colors than will other materials. For example, while the illustrative indium-tin-oxide of FIG. 4 absorbs more blue light 405 than green light 406, and more green light 406 than red light 407, other materials such as graphene, indium-cadmium-oxide, indium-zinc-oxide may absorb more green light 406 than blue light 405 or more red light 407 than green light 406, and so forth. Additionally, variations in thickness of the optically pellucid electrical conductor will change the color shift resulting from absorption due to interference effects.

Accordingly, the light transmission functions 401,402, 403 of FIG. 4 are illustrative only and are intended to demonstrate the fact that an optically pellucid electrical conductor (113) generally absorbs more light than does an optically transparent substrate (103). The light transmission functions 402,403 also demonstrate that an optically pellucid electrical conductor (113) can absorb some colors, here blue light 405 and green light 406, more than other colors, such as red light 407.

From the light transmission functions 401,402,403 of FIG. 4, issues can be seen with coupling an optically pellucid electrical conductor (113) to an optically transparent substrate (103). This is true because the optical transmission of the optically pellucid electrical conductor (113) is less than that of the optically transparent substrate (103). Moreover, the optical transmission of the optically pellucid electrical conductor (113), as demonstrated by light transmission functions 402,403, is not uniform in the visible spectrum that is generally understood to span from about 400 nanometers to about 700 nanometers. This results in the light intensity emanating from the first subarea (304) where the optically pellucid electrical conductor (113) is coupled to the optically transparent substrate (103) being slightly lower than light emanating from the second subarea (305), which has only passed through the optically transparent substrate (103).

When this occurs, this causes the optically pellucid electrical conductor (113) to be visibly perceptible by a person. Where more blue light 405 is absorbed than green light 406, and where more green light 406 is absorbed than red light 407, light passing through the optically pellucid electrical conductor (113) can appear dimmer and more "yellowish" than light passing through the optically transparent substrate (103).

Embodiments of the present disclosure provide a solution to this problem. In one or more embodiments one or more processors (201) operable with the display (102) cause a first set of pixel structures projecting light through the optically transparent substrate (103) and the optically pellucid electrical conductor (113) to project the light with a first luminous intensity, while a second set of pixel structures projecting other light through only the optically transparent substrate (103) project the other light with a second luminous intensity. In one or more embodiments, the first luminous intensity is different from the second luminous intensity. In one or more embodiments the first luminous intensity is greater than the second luminous intensity.

This results in electroluminescent elements of pixel structures positioned beneath the optically pellucid electrical conductor (113) being driven so as to emit light with a higher luminous intensity, and optionally a different composite color, than electroluminescent elements of pixel structures positioned beneath portions of the optically transparent substrate (103) where the optically pellucid electrical conductor (113) is absent. This operation compensates for the optical attenuation caused by the optically pellucid electrical conductor (113).

Advantageously, when using embodiments of the disclosure a uniform luminous intensity emanates from the display plane defined by the optical transmission area of the optically transparent substrate (103), thereby reducing or eliminating the visible perceptibility of the optically pellucid electrical conductor (113). As such, embodiments of the disclosure result in the user being able to look at the display (102) without noticing the presence of the optically pellucid electrical conductor (113).

Embodiments of the disclosure are also operable to correct color distortion, e.g., the "yellowish" issue referenced above, in addition to compensating for the lossy nature of the optically pellucid electrical conductor (113). In one or more embodiments, the electroluminescent elements of pixel structures positioned beneath portions of the optically transparent substrate (103) where the optically pellucid electrical conductor (113) is coupled thereto can be driven with a specific combination to omit less of a particular color, e.g., yellow light, so that color distortion is reduced or eliminated.

Figure 5:
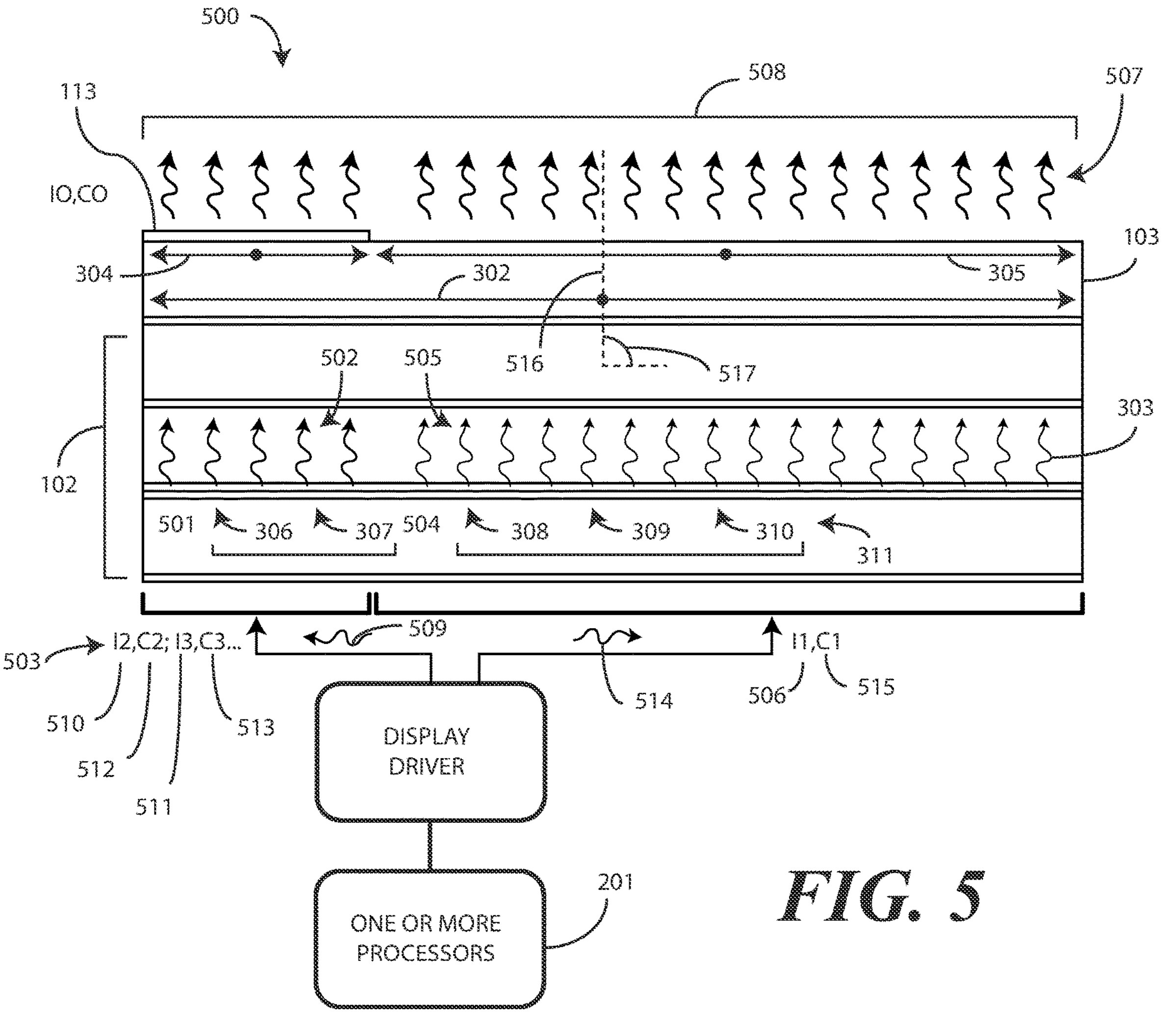
FIG. 5 illustrates one explanatory system in accordance with one or more embodiments of the disclosure.

Turning now to FIG. 5, illustrated therein is one explanatory system 500 in accordance with one or more embodiments of the disclosure. The system 500 includes the sectional view of the display 102 of FIGS. 1 and 3, as well as the one or more processors 201 of FIG. 2. The one or more processors 201 can optionally interact with the display 102 via a display driver in one or more embodiments. In other embodiments, the display driver will be omitted and the one or more processors 201 will control the display 102 directly. Other configurations by which the one or more processors 201 control the display 102 will be obvious to those of ordinary skill in the art having the benefit of this disclosure.

As before, the optically transparent substrate 103 defines an optical transmission area 302. The display 102, disposed beneath the optically transparent substrate 103, comprises an array 311 of pixel structures 306,307,308,309,310. Each pixel structure 306,307,308,309,310 includes a plurality of electroluminescent elements such as those described above with reference to FIG. 1 that are selectively operable to project light 303 through the optical transmission area 302 of the optically transparent substrate 103. Also as before, an optically pellucid electrical conductor 113 is coupled to the optically transparent substrate 103 at a first subarea 304 of the optical transmission area 302 of the optically transparent substrate 103.

Since the optically pellucid electrical conductor 113 is optically lossier than the optically transparent substrate 103, as demonstrated above with reference to FIG. 4, in one or more embodiments the one or more processors 201 cause a first set 501 of pixel structures, shown illustratively by pixel structures 306,307 in FIG. 3, projecting light 502 through the first subarea 304 to project the light 502 with a first luminous intensity 503. This can be done by delivering signals 509 to the a first set 501 of pixel structures causing those pixel structures to light 502 through the first subarea 304 to project the light 502 with a first luminous intensity 503.

In one or more embodiments, the signals 509 cause the first set 501 of pixel structures to project different colors of light with different luminous intensity. Recall from above that in the example described with reference to FIG. 4, the optically pellucid electrical conductor 113 absorbed more blue light (405) than green light (406), and more green light (406) than red light (407). To compensate for such a situation, in one or more embodiments the signals 509 include different intensities 510,511 and different color instructions 512,513 for each electroluminescent element of the pixel structures in the first set 501 of pixel structures.

Illustrating by example, in one embodiment where each pixel structure of the first set 501 of pixel structures comprises at least one green electroluminescent element, a red electroluminescent element, and a blue electroluminescent element, as was the case above in FIG. 1, the one or more processors 201 can cause green electroluminescent elements of the first set 501 of pixel structures and blue electroluminescent elements of the first set 501 of pixel structures to project more light than red electroluminescent elements of the first set 501 of pixel structures. In one embodiment, the one or more processors 201 cause blue electroluminescent elements of the first set 501 of pixel structures to project more light than green electroluminescent elements or red electroluminescent elements of the first set 501 of pixel structures. Doing so would neutralize the "yellowish" look of the optically pellucid electrical conductor 113 when the optically pellucid electrical conductor 113 had a transmission function similar to light transmission function (402) or light transmission function (403) of FIG. 4 above.

In one or more embodiments, the one or more processors 201 also cause a second set 504 of pixel structures projecting other light 505 through the second subarea 305 of the optical transmission area 302 that is complemental to the first subarea 304 to project the other light 505 with a second luminous light intensity 506. This can be done by delivering signals 514 to the second set 504 of pixel structures causing those pixel structures to light 505 through the second subarea 305 to project the light 505 with the second luminous intensity 506. In one or more embodiments the signals 514 include not only second luminous intensity 506 information, but color instructions 515 as well.

In one or more embodiments, the first luminous intensity 503 is different from the second luminous intensity 506. In this illustrative example, where the optically pellucid electrical conductor 113 is lossier than the optically transparent substrate 103, the first luminous intensity 503 is greater than the second luminous intensity 506. Accordingly, the one or more processors 201 cause the first set 501 of pixel structures to project more light than the second set 504 of pixel structures in this embodiment. The fact that more light passes through the first subarea 304, i.e., through the optically pellucid electrical conductor 113, than passes through the second subarea 305 results in light 507 emanating from the display plane 508 defined by the optical transmission area 302 to be uniform such that visible perception of the optically pellucid electrical conductor 113 by a user becomes difficult or impossible.

Where color instructions 515 are included, they will frequently be different from the color instructions 512,513 for the first set 501 of pixel structures due to the fact that the optically pellucid electrical conductor 113 attenuates different wavelengths by different amounts. For instance, in one or more embodiments the first set 501 of pixel structures project a first color of light (which would be a combination of colors resulting from color instructions 512,513), while the second set 504 of pixel structures project a second color of light (identified by color instructions 515). In one or more embodiments, the first color of light is different from the second color of light.

Illustrating by example, if the optically pellucid electrical conductor 113 had a transmission function similar to light transmission function (402) or light transmission function (403) of FIG. 4 above, the color instructions 515 in the signals 514 for the second set 504 of pixel structures would be different from the color instructions 512,513 for the first set 501 of pixel structures. These color instructions 512,513, 515 could cause green electroluminescent elements of the first set 501 of pixel structures and blue electroluminescent elements of the first set 501 of pixel structures to project more light 502 than green electroluminescent elements of the second set 504 of pixel structures and blue electroluminescent elements of the second set 504 of pixel structures, in one embodiment, to compensate for the attenuation of those colors by the optically pellucid electrical conductor 113. Those of ordinary skill in the art having the benefit of this disclosure will readily be able to determine other color differences from other transmission functions for other materials used for the optically pellucid electrical conductor 113.

In FIG. 5, the first set 501 of pixel structures and the second set 504 of pixel structures project the light 502,505 through the first subarea 304 and the second subarea 305 of the optical transmission area 302 along an axis 516 that is oriented at a normal angle 517 relative to the major faces of the optically transparent substrate 103. However, embodiments of the disclosure contemplate that if a user is viewing the display 102 from angles other than normal angles will change the path length through both the optically transparent substrate 103 and the optically pellucid electrical conductor 113. This will cause different wavelengths of light to be visible.

Recall from above, however, that in some embodiments electronic devices configured in accordance with embodiments of the disclosure could detect a user's gaze point by using sensors such as a gaze detector (206) or face analyzer (208). These sensors can further be used to detecting the alignment of a user's head in three-dimensional space relative to the display 102. Electronic signals can then be processed for computing the direction of user's gaze in three-dimensional space relative to the electronic device (100). These sensors can further determine a gaze cone corresponding to the detected gaze direction, which is a field of view within which the user may easily see without diverting their eyes or head from the detected gaze direction.

Figure 6:
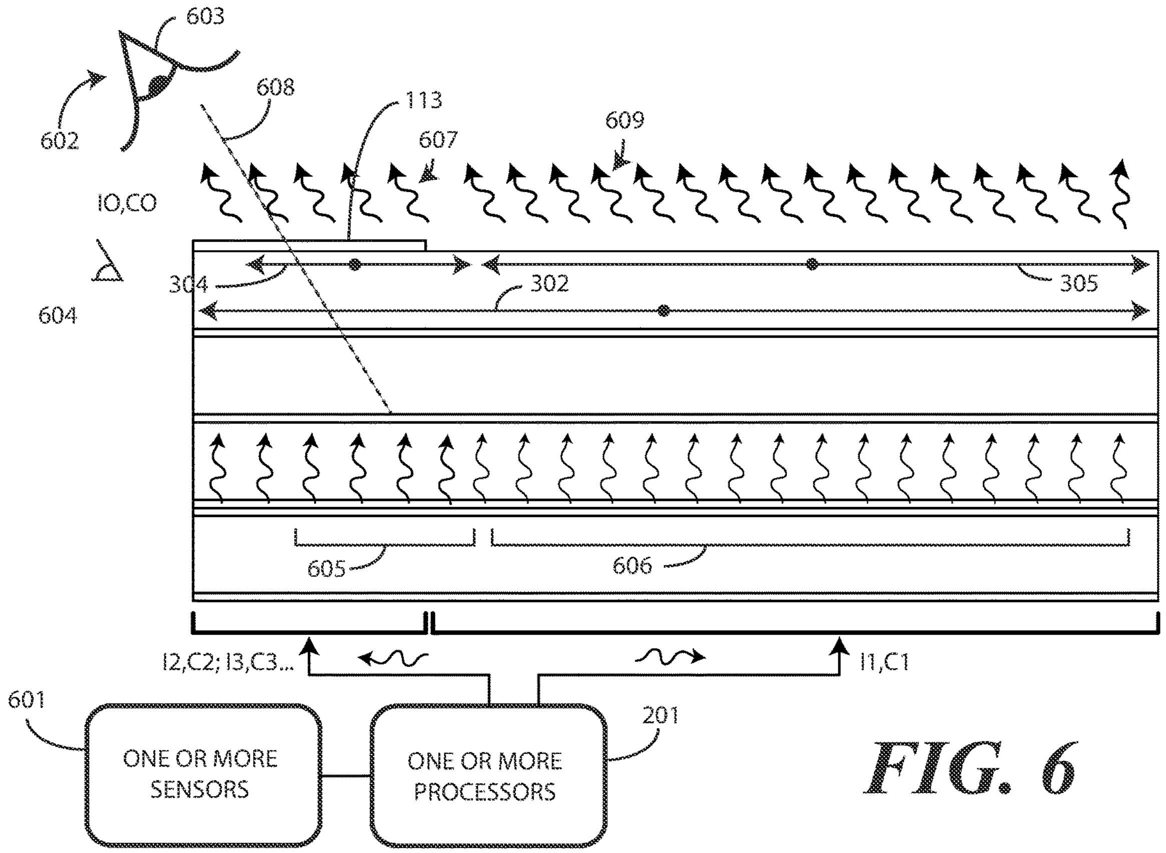
FIG. 6 illustrates explanatory system in accordance with one or more embodiments of the disclosure.

In one or more embodiments, where such sensors are included, the one or more processors 201 can cause different sets of pixel structures to project light along an axis defined between those pixel structures and the user's eyes or gaze cone. Turning now to FIG. 6, illustrated therein is another system 600 demonstrating how this occurs.

As before, the system 600 includes the sectional view of the display 102 of FIGS. 1 and 3, as well as the one or more processors 201 of FIG. 2. The system 600 also includes one or more sensors 601 operable with the one or more processors 201 to determine a location 602 of a person 603 gazing toward the display. Examples of these sensors 601 include the gaze detector (206) or face analyzer (208), as previously described.

The one or more processors 201 can optionally interact with the display 102 via a display driver in one or more embodiments. In FIG. 6, the display driver has been omitted for simplicity. In other embodiments, the display driver will be omitted and the one or more processors 201 will control the display 102 directly. Other configurations by which the one or more processors 201 control the display 102 will be obvious to those of ordinary skill in the art having the benefit of this disclosure.

As before, the optically transparent substrate 103 defines an optical transmission area 302. Also as before, an optically pellucid electrical conductor 113 is coupled to the optically transparent substrate 103 at a first subarea 304 of the optical transmission area 302 of the optically transparent substrate 103.

Since the person 603 is no longer viewing the display 102 at an angle that is normal to the major faces of the optically transparent substrate 103, but is instead viewing the display 102 at an acute angle 604, the person 603 sees a different set of pixel structures than they would when viewing the display 102 at a normal angle of incidence. Recall from FIG. 5 above that when the viewing angle is normal to major faces of the optically transparent substrate 103, a first set (501) of pixel structures project light through the optically pellucid electrical conductor 113, while a second set (504) project light through portions of the optically transparent substrate 103 where the optically pellucid electrical conductor 113 is absent.

To compensate for the change in color and/or light intensity caused by the acute angle 604 at which the person 603 is viewing the display 102, in FIG. 6 the one or more processors 201 cause a third set 605 of pixel structures to project light 607 through the first subarea 304 along an axis 608 defined between the third set 605 of pixel structures and the location 602 of the person 603. In one embodiment, due to the different path length through both the optically transparent substrate 103 and the optically pellucid electrical conductor 113, the one or more processors 201 cause the third set 605 of pixel structures to project light 607 through the first subarea 304 along the axis 608 defined between the third set 605 of pixel structures and the location 602 of the person 603 with at least the first luminous intensity (503) that would be used if the person 603 were viewing the display 102 at a normal angle of incidence. In other embodiments, the one or more processors 201 cause the third set 605 of pixel structures to project light 607 through the first subarea 304 along the axis 608 defined between the third set 605 of pixel structures and the location 602 of the person 603 with a luminous intensity that is greater than the first luminous intensity (503) that would be used if the person 603 were viewing the display 102 at a normal angle of incidence.

In one or more embodiments, the one or more processors 201 cause a fourth set 606 of pixel structures to project light 609 through the second subarea 305 along the axis 608. In one embodiment, due to the longer path length through the optically transparent substrate 103, the one or more processors 201 cause the fourth set 606 of pixel structures to project light 609 through the second subarea 305 along the axis 608 with at least the second luminous intensity (506) that would be used if the person 603 were viewing the display 102 at a normal angle of incidence. In other embodiments, the one or more processors 201 cause the fourth set 606 of pixel structures to project light 607 through the second subarea 305 along the axis 608 with a luminous intensity that is greater than the second luminous intensity (506) that would be used if the person 603 were viewing the display 102 at a normal angle of incidence.

Figure 7:
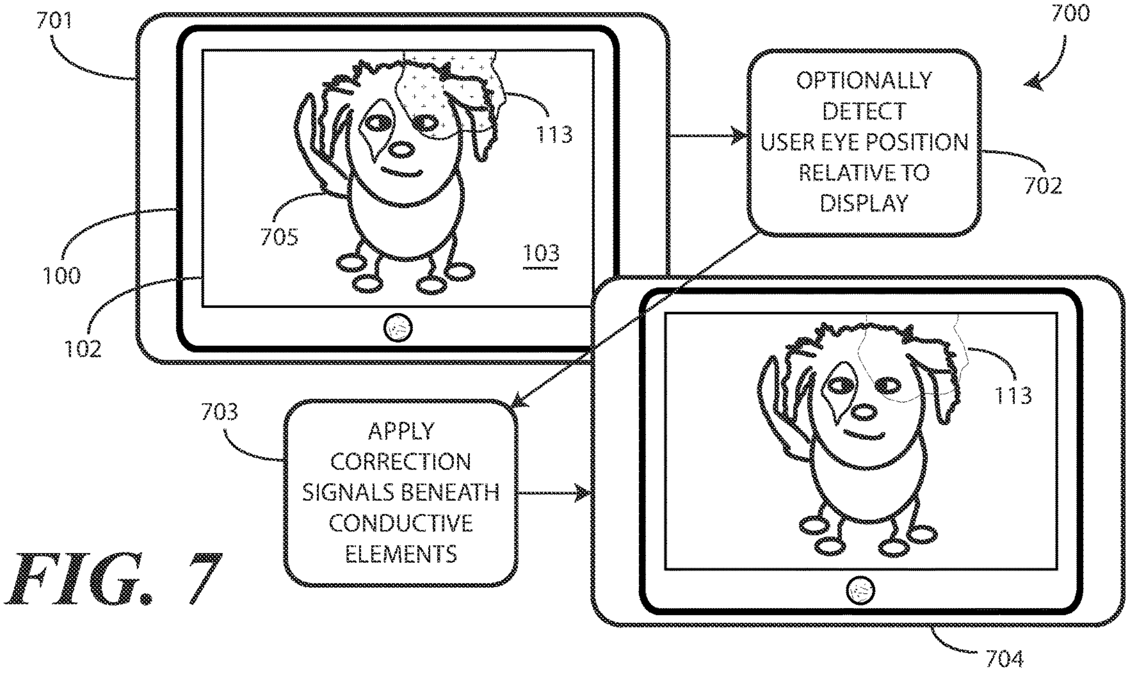
FIG. 7 illustrates one explanatory electronic device in accordance with one or more embodiments of the disclosure.

Turning now to FIG. 7, illustrated therein is one method 700 describing operational steps suitable for use with the electronic device (100) of FIGS. 1 and 2, or the systems (500,600) of FIGS. 5 and 6. Beginning at step 701, an electronic device 100 is shown projecting an image 705 from a display 102. The electronic device 100 includes at least one optically transparent substrate 103 defining an optical transmission area through which the image 705 is projected. Beneath the optically transparent substrate 103 is the display 102. The display 102 comprises an array of pixel structures each comprising a plurality of electroluminescent elements selectively operable to project light through the optical transmission area of the optically transparent substrate 103.

As before, an optically pellucid electrical conductor 113 is coupled to the optically transparent substrate 103 at a first subarea of the optical transmission area. In this illustrative embodiment, the optically pellucid electrical conductor 113 is configured as an antenna.

As shown in FIG. 7, the optically pellucid electrical conductor 113 is visible above the image 705 due to the fact that it is lossy, absorbing more light at various wavelengths than the optically transparent substrate 103. Thus, the presence of the optically pellucid electrical conductor 113 changes both luminous intensity of light being emitted by the display 102 and the color of the light emanating from the display 102.

In some optional embodiments, the electronic device 100 can include one or more sensors configured to determine a location of a person viewing the optically transparent substrate 103. Where this is the case optional step 702 comprises determining the location of the person relative to an exterior major face of the optically transparent substrate 103. In one or more embodiments, step 702 further comprises determining an axis defined between the location of the person viewing the display and one or more pixel structures of the display projecting light along that axis.

At step 703, the method 700 delivers corrective signals to various sets of pixel structures of the display 102 to compensate for light losses occurring at various wavelengths through the optically pellucid electrical conductor 113. In one or more embodiments, step 703 comprises causing light passing through a first subarea of an optically transparent substrate 103 defined where the optically pellucid electrical conductor 113 is coupled to the optically transparent substrate 103 to have a greater luminous intensity than other light passing through a second subarea of the optically transparent substrate 103 that is complemental to the first subarea.

In one or more embodiments, step 703 comprises one or more processors of the electronic device 100 causing a first set of pixel structures projecting the light through the first subarea to project the light with a first luminous intensity and a second set of pixel structures projecting light through the second subarea to project the other light with a second luminous intensity. In one or more embodiments, the first luminous intensity is greater than the second luminous intensity.

In one or more embodiments, step 703 comprises one or more processors of the electronic device 100 causing a first set of pixel structures projecting the light through the first subarea to project the light with a first color, while a second set of pixel structures project light through the second subarea to project the other light with a second color. In one or more embodiments, the first color is different from the second color.

Where step 702 is included in the method 700, i.e., where the method 700 includes one or more sensors of the electronic device 100 determining a location of a person viewing the optically transparent substrate 103, step 703 can include causing the first set of pixel structures to project the light through the first subarea along an axis defined between the optically transparent substrate and the location, while the second set of pixel structures project the other light through the second subarea along the axis. As shown in step 704, the compensation actions of step 703 cause the optically pellucid electrical conductor 113 to substantially or completely become invisible to the viewer due to the fact that light emanating from the optically pellucid electrical conductor 113 and portions of the optically transparent substrate 103 where the optically pellucid electrical conductor 113 is absent to become substantially uniform in luminous intensity with a consistent color palate.

Figure 8:
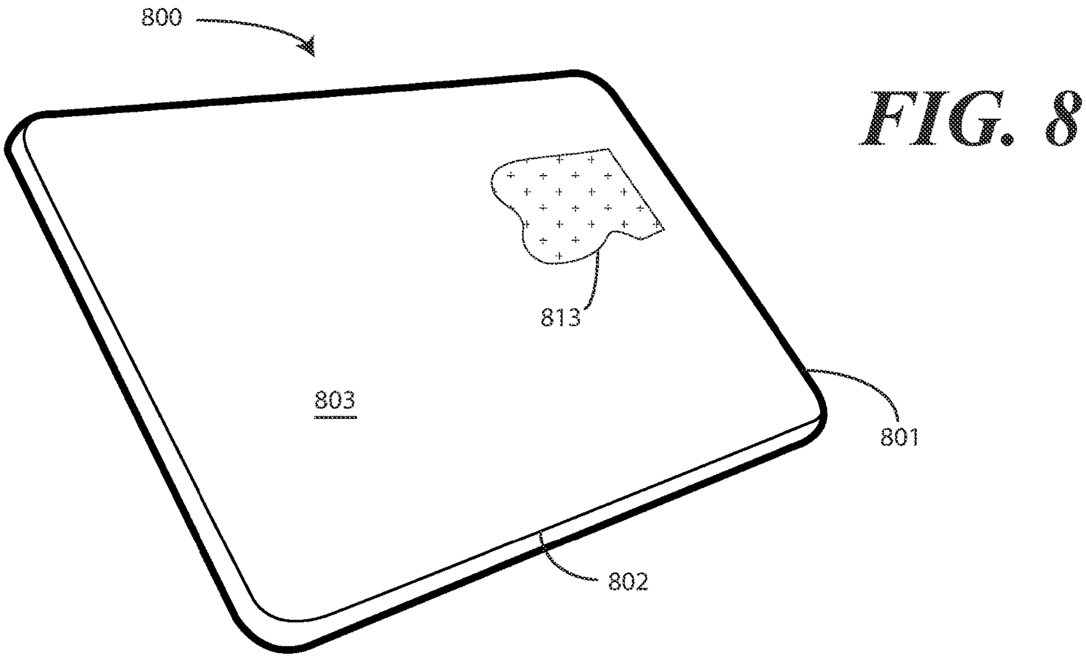
FIG. 8 illustrates another explanatory electronic device in accordance with one or more embodiments of the disclosure.

Turning now to FIG. 8, illustrated therein is another electronic device 800 configured in accordance with one or more embodiments of the disclosure. The rear surface 801 of the electronic device 800 is shown in FIG. 8, with the rear surface 801 comprising an optically transparent substrate 803 defining a major face of the rear surface 801 of the electronic device 800. Embodiments of the disclosure contemplate that with electronic devices configured in this manner, i.e., with a "glass-backed" surface, an optically pellucid electrical conductor 813 can be printed on the optically transparent substrate 803, thereby allowing antennas, signal conductors, switches, and other electronics to occupy this otherwise unused surface.

In this illustrative embodiment, however, the rear surface 801 is not only comprised of the optically transparent substrate 803. To the contrary, a device housing 802 is placed beneath the optically transparent substrate 803. In this example, the device housing 802 abuts the rear major face of the optically transparent substrate 803.

In one or more embodiments, the device housing 802 is painted with a reflective material that reflects a particular color of light. Illustrating by example, if the electronic device 800 is intended to have a red visual appearance, the device housing 802 may be pained with reflective material in the form of one of a flat red paint, matte red paint, gloss, red paint, metallic red paint, and so forth.

Since the optically pellucid electrical conductor 813 is lossy, it will absorb certain wavelengths in accordance with a light transmission function, one example of which was shown and described above with reference to FIG. 4. Due to this luminous intensity reduction and color shift, the presence of the optically pellucid electrical conductor 813 will be noticeable to the human eye.

Embodiments of the disclosure advantageously provide a solution to this problem. To address this issue, in one or more embodiments the rear housing 802 of the electronic device 800 is divided into a first subarea and a second subarea. The first subarea is the area at which the optically pellucid electrical conductor 813 is coupled to the optically transparent substrate 803. The second subarea is complemental to the first subarea, and is defined by portions of the optically transparent substrate 803 where the optically pellucid electrical conductor 813 is absent. Accordingly, portions of the device housing 802 that reflect light through both the optically pellucid electrical conductor 813 and the optically transparent substrate 803 would be within the first subarea, while other portions of the device housing 802 that reflect light through only the optically transparent substrate 803, but not the optically pellucid electrical conductor 813, would be within the second subarea. The first subarea and second subarea do not overlap.

In one or more embodiments, the device housing 802 comprises a first reflective material reflecting light through the first subarea and a second reflective material reflecting other light through a second subarea. In one or more embodiments, the first reflective material is more reflective than the second reflective material. In one or more embodiments, the first reflective material reflects a first color of light through the first subarea, while the second reflective material reflects a second color of light through the second subarea, with the first color of light and the second color of light being different. In one or more embodiments, the first color of light comprises more green light and more blue light than the second color of light. Examples of this construction and its compensatory effects will be described below with reference to FIGS. 9-11.

Figure 9:
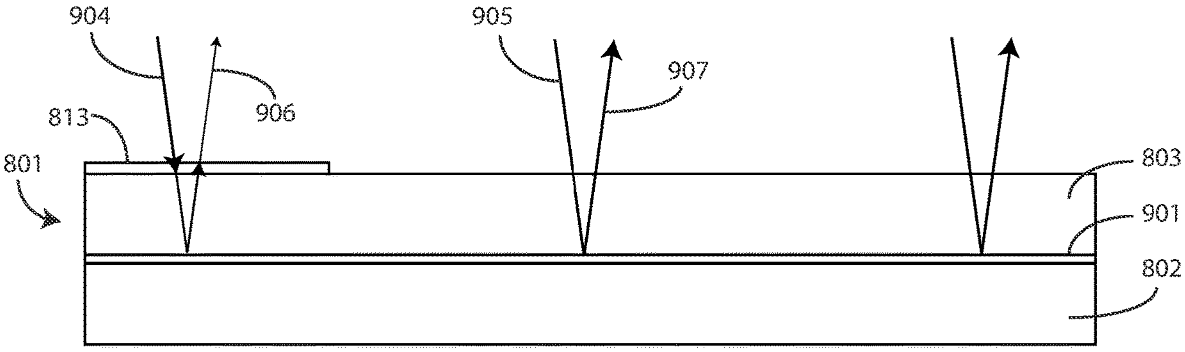
FIG. 9 illustrates a sectional view of a surface of one explanatory electronic device in accordance with one or more embodiments of the disclosure.

Beginning with FIG. 9, illustrated therein is a sectional view of the rear surface 801 of the electronic device. Shown in FIG. 9 are the optically transparent substrate 803, the optically pellucid electrical conductor 813, the device housing 802, and the reflective material 901 disposed on the device housing 802. The optically pellucid electrical conductor 813 is coupled to the optically transparent substrate 803 at a first subarea 902 of the optically transparent substrate 803. The device housing 802 abuts the optically transparent substrate 803, as shown in the figure.

The reflective material 901 reflects light 904 through the first subarea 902, i.e., through both the optically transparent substrate 803 and the optically pellucid electrical conductor 813. The reflective material 901 also reflects other light 905 through a second subarea 903 of the optically transparent substrate 803, i.e., only through the optically transparent substrate 803 and not through the optically pellucid electrical conductor 813 due to the fact that the optically pellucid electrical conductor 813 is not coupled to the optically transparent substrate 803 at the second subarea 903.

Since the optically pellucid electrical conductor 813 is lossy, reflected light 906 emanating from the optically pellucid electrical conductor 813 has a lower luminous intensity and different color than reflected light 907 emanating from the optically transparent substrate 803 without passing through the optically pellucid electrical conductor 813.

Figure 10:
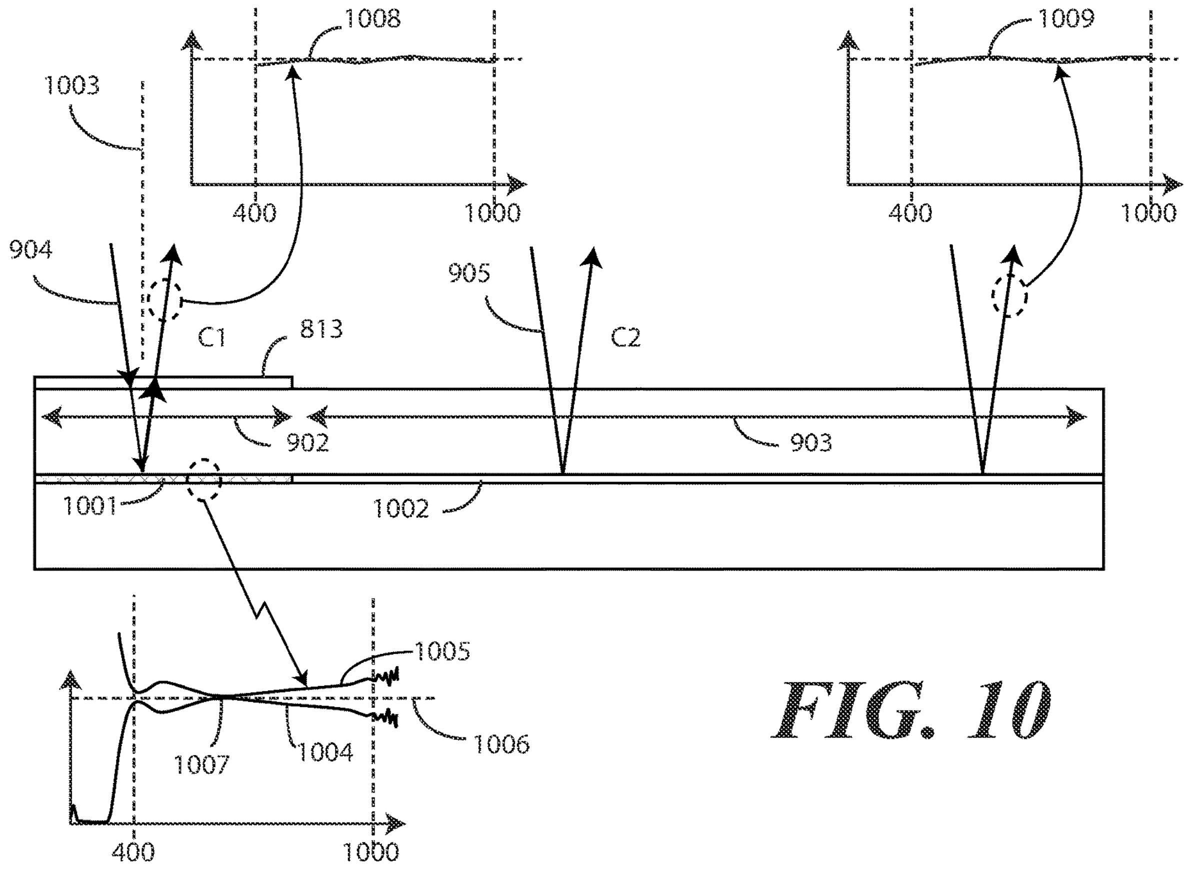
FIG. 10 illustrates a sectional view of a surface of another explanatory electronic device in accordance with one or more embodiments of the disclosure.

Turning now to FIG. 10, to compensate for the non-uniformity of reflection, in one or more embodiments the reflective material (901) is divided into a first reflective material 1001 and a second reflective material 1002. In one or more embodiments, the first reflective material 1001 reflects light 904 through the first subarea 902, while the second reflective material 1002 reflects other light 905 through the second subarea 903 of the optically transparent substrate 803. As before, the first subarea 902 is complemental to the second subarea 903.

In this illustrative embodiment, the first reflective material 1001 is more reflective than the second reflective material 1002 to compensate for the lossy nature of the optically pellucid electrical conductor 813. In one or more embodiments, the first reflective material 1001 reflects a first color of light through the first subarea 902, while the second reflective material 1002 reflects a second color of light through the second subarea 903. In this illustrative embodiment, the first color of light and the second color of light are different to compensate for the absorption at different wavelengths by the optically pellucid electrical conductor 813. In one embodiment, the first color of light comprises more green light and more blue light than the second color of light.

The first reflective material 1001, which reflects light through the first subarea 902 along an axis 1003 normal to a major surface of the optically transparent substrate 803 in one or more embodiments, can be tuned to the specific material, thickness, and placement of the optically pellucid electrical conductor 813. For example, in this illustration the optically pellucid electrical conductor 813 defines a light transmission function 1004 of wavelength that looks similar to the light transmission functions (402,403) of FIG. 4. Consequently, the optically pellucid electrical conductor 813 absorbs more blue light and green light than red light.

In one or more embodiments, the first reflective material 1001 defines a light reflection function 1005 of light wavelength. In this illustrative embodiment, the light reflection function 1005 defines a horizontal reflection function of the light reflection function 1005. As understood by those of ordinary skill in the art, a horizontal reflection function reflects a first function about a horizontal axis. Here, the horizontal axis is an axis 1006 that is tangential to an apex 1007 of the light transmission function 1004. Accordingly, the first reflective material 1001 reflects the exact complement of light absorbed by the optically pellucid electrical conductor 813, namely, more blue light than green light, and more green light than red light. The result is a luminous output 1008 from the first subarea 902 that is substantially or exactly uniform with the luminous output 1009 from the second subarea 903. This results in the visibility of the optically pellucid electrical conductor 813 being reduced or eliminated.

Figure 11:
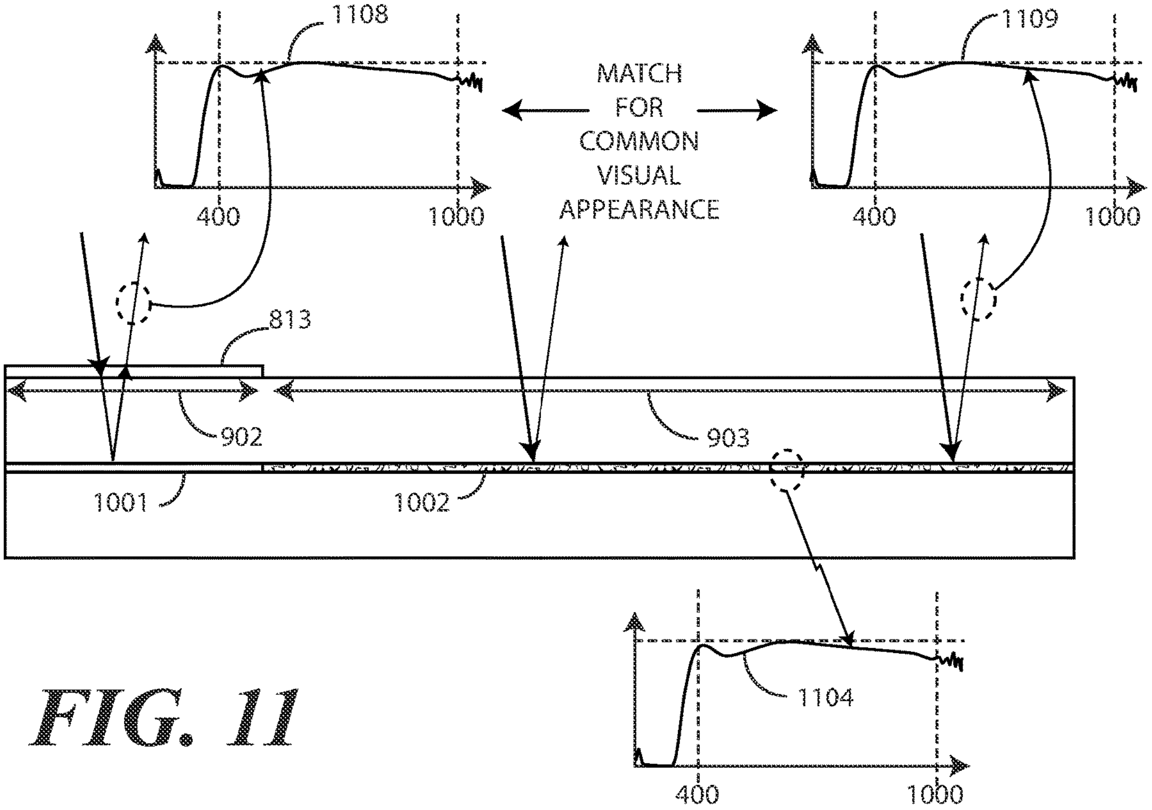
FIG. 11 illustrates a sectional view of a surface of yet another explanatory electronic device in accordance with one or more embodiments of the disclosure.

Turning now to FIG. 11, illustrated therein is another example of how a luminous output 1108 from the first subarea 902 can become substantially or exactly uniform with the luminous output 1109 from the second subarea 903 in one or more embodiments of the disclosure. Rather than making the light reflection function of the first reflective material 1001 the horizontal reflection function of the light transmission function (1004) of the optically pellucid electrical conductor 813, the reflectiveness of the second reflective material 1002 is altered to have a reflection absorption function where not all light is reflected uniformly. Instead, the second reflective material 1002 absorbs some wavelengths in larger amounts than others. Accordingly, in this example less blue light is reflected than green light, and less green light is reflected than red light, thereby providing the uniform appearance. The color of the first reflective material 1001 and the second reflective material 1002 can then be adjusted for any "yellowish" effects that may result.

Figure 12:
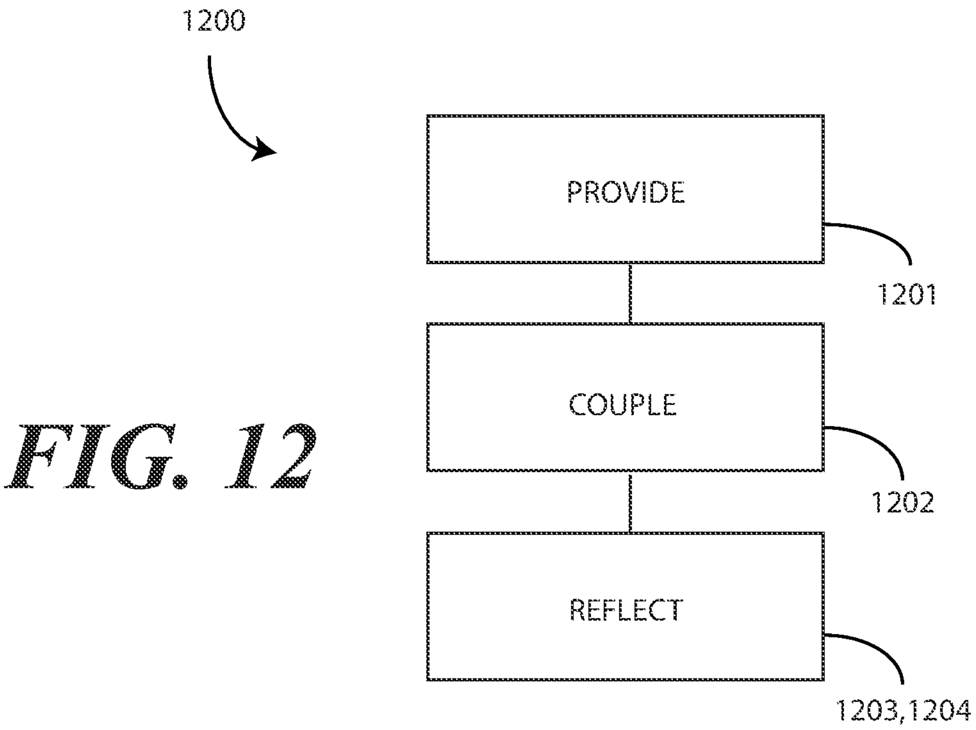
FIG. 12 illustrates another explanatory method in accordance with one or more embodiments of the disclosure.

Turning now to FIG. 12, illustrated therein is one explanatory method 1200 suitable for reducing the visibility of the optically pellucid electrical conductor (813) in the embodiments described above with reference to FIGS. 8-11. The method 1200 causes light passing through a first subarea of an optically transparent substrate defined where an optically pellucid electrical conductor is coupled to the optically transparent substrate to have a greater luminous intensity than other light passing through a second subarea of the optically transparent substrate that is complemental to the first subarea.

Beginning at step 1201, the method 1200 comprises providing an electronic device with an optically transparent substrate, an optically pellucid electrical conductor coupled to the optically transparent substrate at a first subarea of the optically transparent substrate, and a housing abutting the optically transparent substrate. At step 1202, the method 1200 comprises coupling a reflective substrate to the housing. Since the housing abuts the optically transparent substrate, this step 1202 couples the reflective substrate to the optically transparent substrate.

In one or more embodiments, the reflective substrate coupled to the housing at step 1202 comprises a first reflective material defining a first reflective coefficient. In one or more embodiments, step 1202 comprises disposing the first reflective material along the housing at regions from which the light reflects through the first subarea.

In one or more embodiments, the reflective substrate coupled to the housing at step 1202 also comprises a second reflective material defining a second reflective coefficient. In one or more embodiments, step 1202 comprises disposing the second reflective material at regions from which the other light reflects through the second subarea.

In one or more embodiments, the first reflective material positioned between the housing and the optically transparent substrate at step 1202 reflects a first color of light through the first subarea. In one or more embodiments, the second reflective material positioned between the housing and the optically transparent substrate at step 1202 reflects a second color of light through the second subarea. In one or more embodiments, the first color of light and the second color of light are different.

Accordingly, step 1203 comprises the reflective material reflecting light through both the first subarea and a second subarea of the optically transparent substrate. Step 1204 comprises the reflective material reflecting a first color of light through the first subarea and the second reflective material reflecting a second color of light through the second subarea, where the first color of light and the second color of light are different. The resulting uniformly reflected light emanating from the first subarea and the second subarea causes the optically pellucid electrical conductor to become less visible or invisible.

Figure 13:
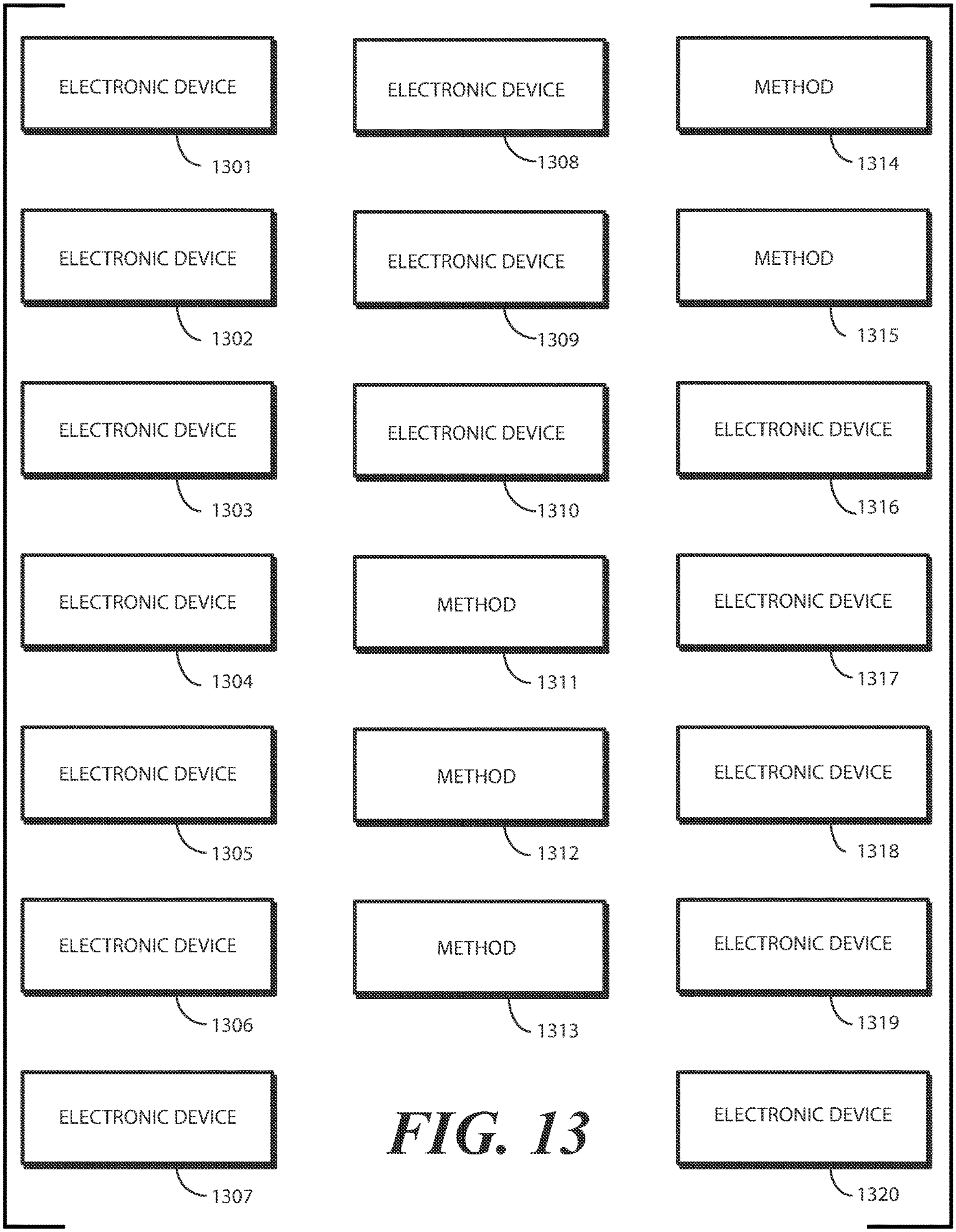
FIGS. 13A-T illustrate one or more embodiments of the disclosure.
Figure 13B:
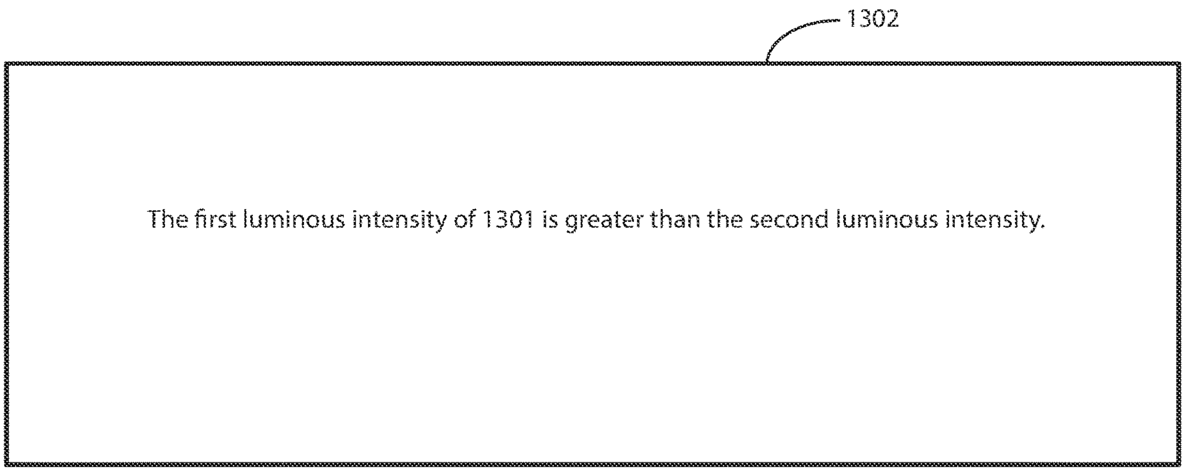
Figure 13C:
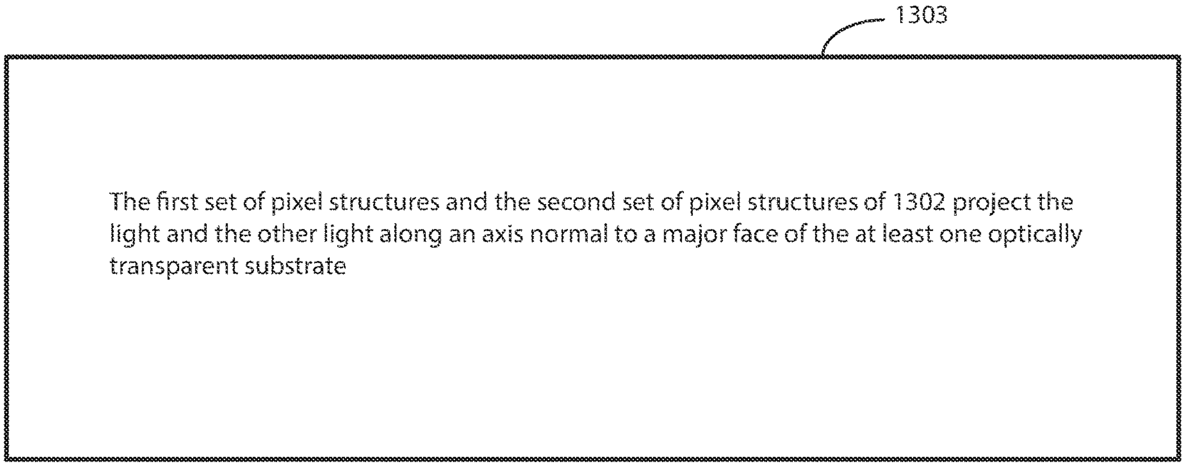
Figure 13D:
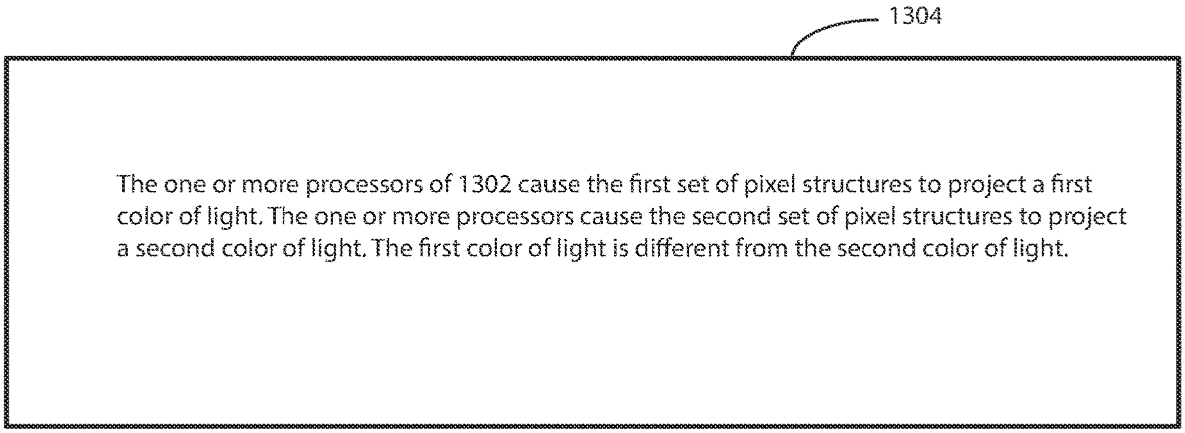
Figure 13F:
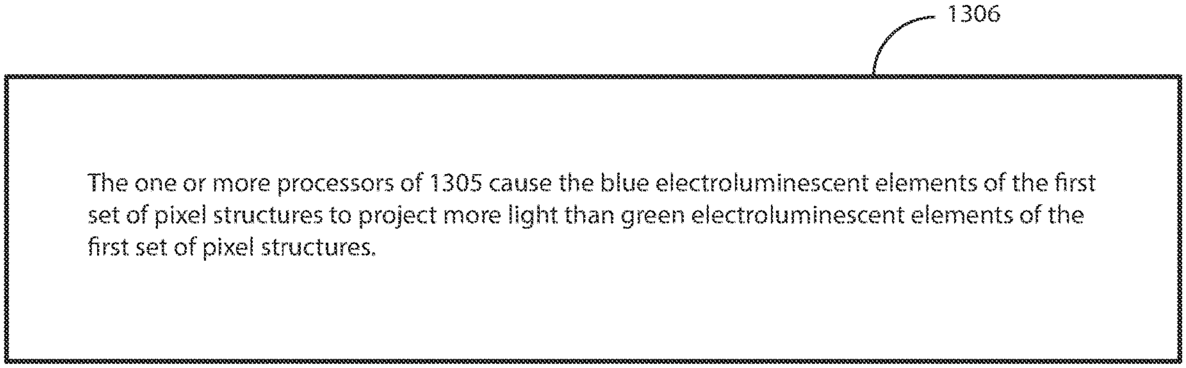
Figure 13G:
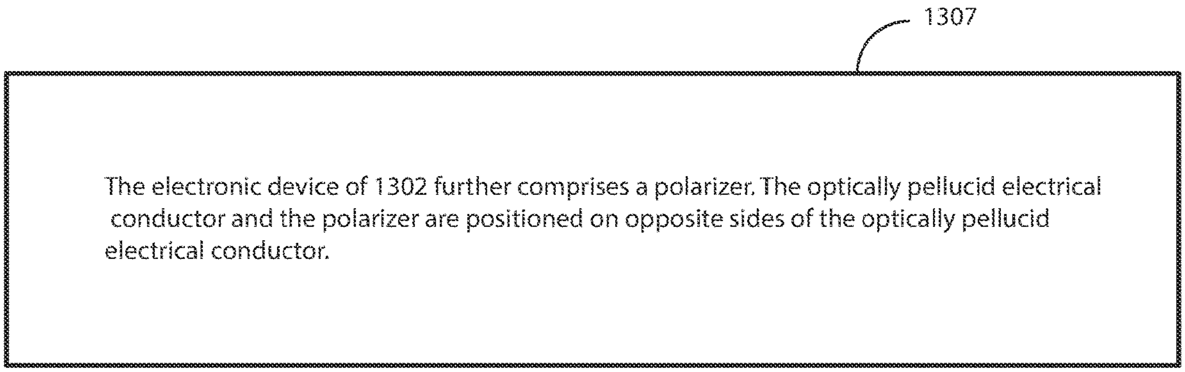
Figure 13H:
Figure 13J:
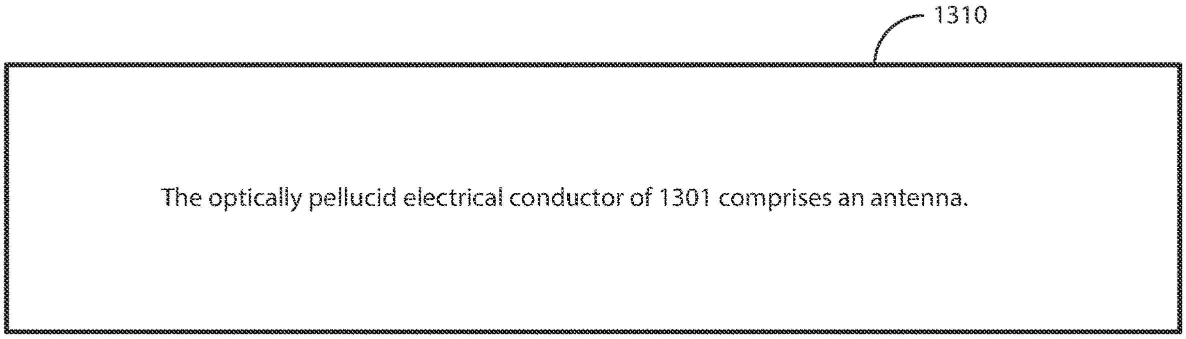
Figure 13K:
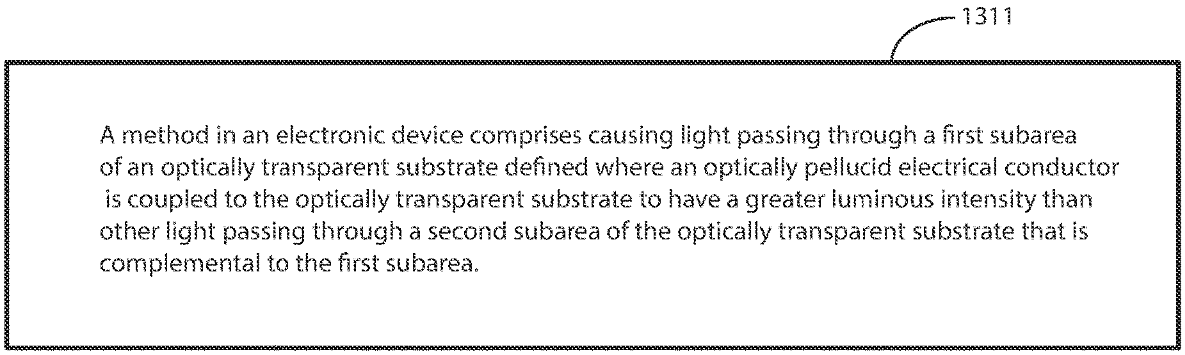
Figure 13O:
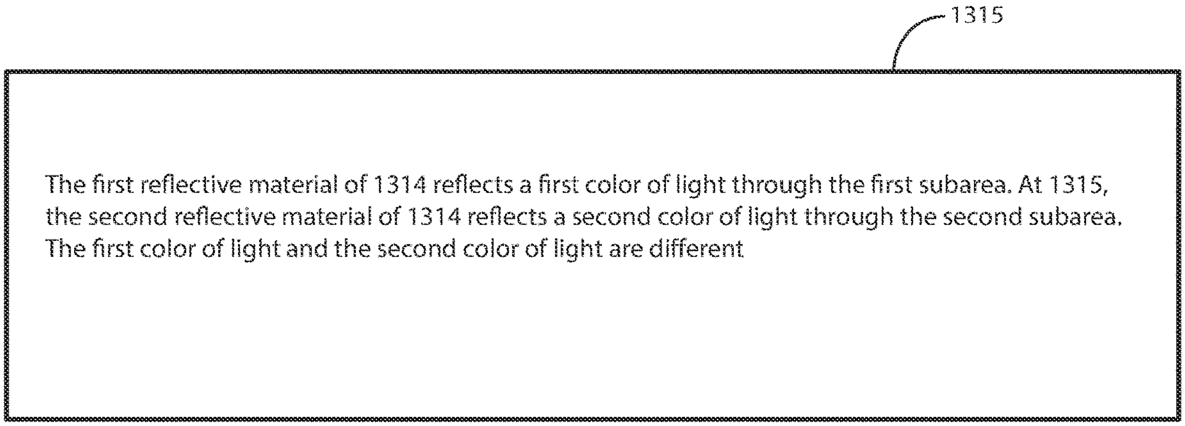
Figure 13Q:
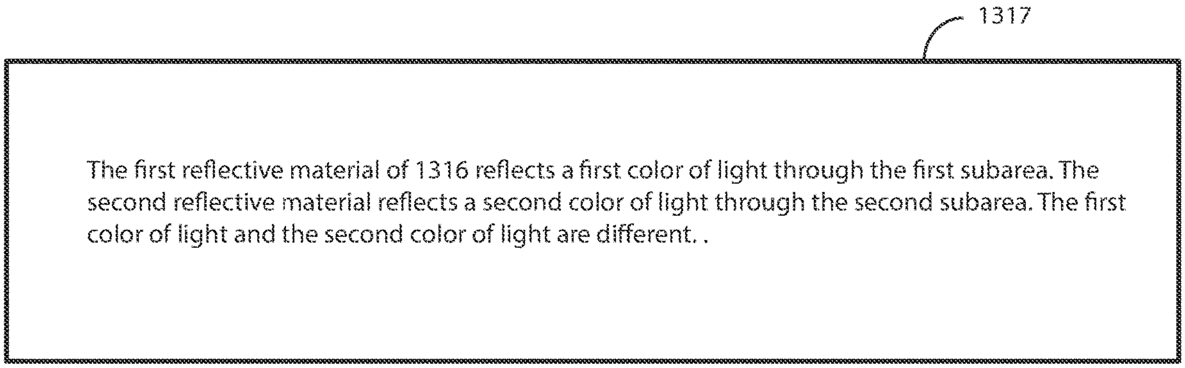
Figure 13T:
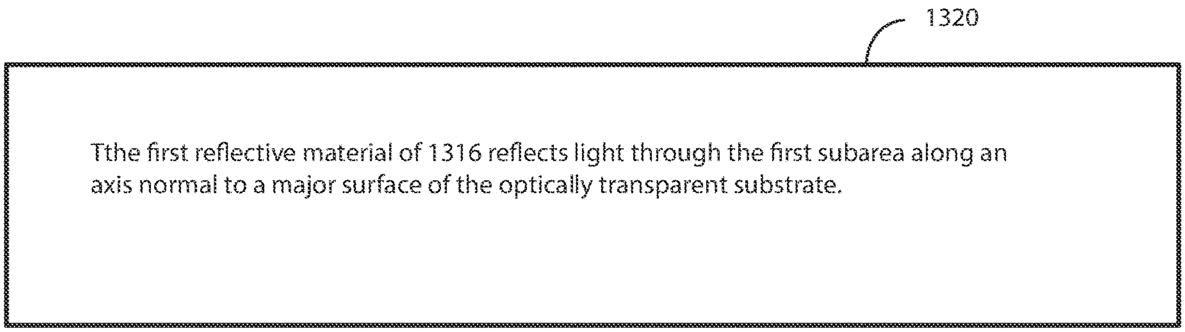

Turning now to FIGS. 13A-T, illustrated therein are various embodiments of the disclosure. Beginning at 1301, an electronic device comprises at least one optically transparent substrate defining an optical transmission area. At 1301, the electronic device comprises a display comprising an array of pixel structures each comprising a plurality of electroluminescent elements selectively operable to project light through the optical transmission area. At 1301, the electronic device comprises an optically pellucid electrical conductor coupled to the at least one optically transparent substrate at a first subarea of the optical transmission area. At 1301, the electronic device comprises one or more processors operable with the display.

At 1301, the one or more processors cause a first set of pixel structures projecting light through the first subarea to project the light with a first luminous intensity. At 1301, the one or more processors cause a second set of pixel structures projecting other light through a second subarea of the optical transmission area that is complemental to the first subarea to project the other light with a second luminous intensity. At 1301, the first luminous intensity is different from the second luminous intensity.

At 1302, the first luminous intensity of 1301 is greater than the second luminous intensity. At 1303, the first set of pixel structures and the second set of pixel structures of 1302 project the light and the other light along an axis normal to a major face of the at least one optically transparent substrate.

At 1304, the one or more processors of 1302 cause the first set of pixel structures to project a first color of light. At 1304, the one or more processors cause the second set of pixel structures to project a second color of light. At 1304, the first color of light is different from the second color of light.

At 1305, each electroluminescent element of 1304 comprises at least one green electroluminescent element, a red electroluminescent element, and a blue electroluminescent element. At 1305, the one or more processors causing green electroluminescent elements of the first set of pixel structures and blue electroluminescent elements of the first set of pixel structures to project more light than green electroluminescent elements of the second set of pixel structures and blue electroluminescent elements of the second set of pixel structures. At 1306, the one or more processors of 1305 cause the blue electroluminescent elements of the first set of pixel structures to project more light than green electroluminescent elements of the first set of pixel structures.

At 1307, the electronic device of 1302 further comprises a polarizer. At 1307, the optically pellucid electrical conductor and the polarizer are positioned on opposite sides of the optically pellucid electrical conductor. At 1308, the display of 1307 comprises a touch-sensitive Active Matrix Organic Light Emitting Diode (AMOLED) display.

At 1309, the electronic device of 1301 further comprises one or more sensors operable with the one or more processors. At 1309, the one or more sensors determine a location of a person gazing toward the display. At 1309, the one or more processors cause a third set of pixel structures to project the light through the first subarea along an axis defined between the third set of pixel structures and the location with at least the first luminous intensity, while a fourth set of pixel structures project the other light through the second subarea along the axis with at least the second luminous intensity. At 1310, the optically pellucid electrical conductor of 1301 comprises an antenna.

At 1311, a method in an electronic device comprises causing light passing through a first subarea of an optically transparent substrate defined where an optically pellucid electrical conductor is coupled to the optically transparent substrate to have a greater luminous intensity than other light passing through a second subarea of the optically transparent substrate that is complemental to the first subarea. At 1312, the causing of 1311 comprises one or more processors of the electronic device causing a first set of pixel structures projecting the light through the first subarea to project the light with a first luminous intensity and a second set of pixel structures projecting light through the second subarea to project the other light with a second luminous intensity.

At 1313, the method of 1312 further comprises one or more sensors of the electronic device determining a location of a person viewing the optically transparent substrate. At 1313, the one or more processors cause the first set of pixel structures to project the light through the first subarea along an axis defined between the optically transparent substrate and the location and the second set of pixel structures to project the other light through the second subarea along the axis.

At 1314, the causing of 1311 comprises coupling a reflective substrate to the optically transparent substrate. At 1314, the reflective substrate comprises a first reflective material defining a first reflective coefficient disposed at regions from which the light reflects through the first subarea and a second reflective material defining a second reflective coefficient disposed at regions from which the other light reflects through the second subarea.

At 1315, the first reflective material of 1314 reflects a first color of light through the first subarea. At 1315, the second reflective material of 1314 reflects a second color of light through the second subarea. At 1315, the first color of light and the second color of light are different.

At 1316, an electronic device comprises an optically transparent substrate. At 1316, the electronic device comprises an optically pellucid electrical conductor coupled to the optically transparent substrate at a first subarea of the optically transparent substrate. At 1316, the electronic device comprises a housing abutting the optically transparent substrate. At 1316, the housing comprises a first reflective material reflecting light through the first subarea and a second reflective material reflecting other light through a second subarea of the optically transparent substrate that is complemental to the first subarea. At 1316, the first reflective material is more reflective than the second reflective material.

At 1317, the first reflective material of 1316 reflects a first color of light through the first subarea. At 1317, the second reflective material reflects a second color of light through the second subarea. At 1317, the first color of light and the second color of light are different. At 1318, the first color of light of 1317 comprises more green light and more blue light than the second color of light.

At 1319, the optically pellucid electrical conductor of 1316 defines a light transmission function of light wavelength. At 1319, the first reflective material of 1316 defines a light reflection function of the light wavelength. At 1319, the light absorption function defines a horizontal reflection function of the light reflection function. At 1320, the first reflective material of 1316 reflects light through the first subarea along an axis normal to a major surface of the optically transparent substrate.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure.

What is claimed is:

1. An electronic device, comprising:

a fascia defining an exterior major surface of the electronic device;

a display comprising an array of pixel structures each comprising a plurality of electroluminescent elements selectively operable to project light through the exterior major surface;

an optically pellucid electrical conductor coupled to the exterior major surface at a first subarea of the exterior major surface atop the array of pixel structures; and one or more processors operable with the display, the one or more processors causing:

a first set of pixel structures projecting light through the first subarea of the exterior major surface to project the light with a first luminous intensity; and a second set of pixel structures projecting other light through a second subarea of the exterior major surface that is complemental to the first subarea to project the other light with a second luminous intensity;

the first luminous intensity being different from the second luminous intensity and the first luminous intensity being greater than the second luminous intensity;

further comprising a polarizer, the optically pellucid electrical conductor and the polarizer positioned on opposite sides of the fascia.

2. The electronic device of claim 1, the electronic device comprising a smartphone.

3. The electronic device of claim 1, the first set of pixel structures and the second set of pixel structures projecting the light and the other light along an axis normal to the exterior major surface.

4. The electronic device of claim 1, the one or more processors causing:

the first set of pixel structures to project a first color of light; and the second set of pixel structures to project a second color of light;

the first color of light being different from the second color of light.

5. The electronic device of claim 4, each electroluminescent element comprising at least one green electroluminescent element, a red electroluminescent element, and a blue electroluminescent element, the one or more processors causing green electroluminescent elements of the first set of pixel structures and blue electroluminescent elements of the first set of pixel structures to project more light than green electroluminescent elements of the second set of pixel structures and blue electroluminescent elements of the second set of pixel structures.

6. The electronic device of claim 5, the one or more processors causing the blue electroluminescent elements of the first set of pixel structures to project more light than green electroluminescent elements of the first set of pixel structures.

7. The electronic device of claim 1, the polarizer coupled to the fascia with an optically transparent adhesive.

8. The electronic device of claim 7, the display comprising a touch-sensitive Active Matrix Organic Light Emitting Diode (AMOLED) display.

9. The electronic device of claim 1, further comprising one or more sensors operable with the one or more processors, the one or more sensors determining a location of a person gazing toward the display, the one or more processors causing:

a third set of pixel structures to project the light through the first subarea along an axis defined between the third set of pixel structures and the location with at least the first luminous intensity; and a fourth set of pixel structures to project the other light through the second subarea along the axis with at least the second luminous intensity.

10. The electronic device of claim 1, the optically pellucid electrical conductor comprising an antenna.

11. A method in an electronic device, the method comprising causing light passing through a first subarea of a fascia defining an exterior major surface of the electronic device defined where an optically pellucid electrical conductor defining an antenna is coupled to the exterior major surface of the electronic device to have a greater luminous intensity than other light passing through a second subarea of the fascia defining the exterior major surface of the electronic device that is complemental to the first subarea.

12. The method of claim 11, the causing comprising one or more processors of the electronic device causing a first set of pixel structures projecting the light through the first subarea to project the light with a first luminous intensity and a second set of pixel structures projecting light through the second subarea to project the other light with a second luminous intensity.

13. The method of claim 12, further comprising one or more sensors of the electronic device determining a location of a person viewing the fascia, the one or more processors causing the first set of pixel structures to project the light through the first subarea along an axis defined between the fascia and the location and the second set of pixel structures to project the other light through the second subarea along the axis.

14. The method of claim 11, the causing comprising coupling a reflective substrate to the fascia, the reflective substrate comprising a first reflective material defining a first reflective coefficient disposed at regions from which the light reflects through the first subarea and a second reflective material defining a second reflective coefficient disposed at regions from which the other light reflects through the second subarea.

15. The method of claim 14, the first reflective material reflecting a first color of light through the first subarea, the second reflective material reflecting a second color of light through the second subarea, the first color of light and the second color of light being different.

16. An electronic device, comprising:

a fascia defining an exterior major surface of the electronic device;

an optically pellucid electrical conductor coupled to the exterior major surface at a first subarea of the exterior major surface; and a housing abutting the fascia;

the housing comprising a first reflective material reflecting light through the first subarea and a second reflective material reflecting other light through a second subarea of the fascia that is complemental to the first subarea;

the first reflective material being more reflective than the second reflective material.

17. The electronic device of claim 16, the first reflective material reflecting a first color of light through the first subarea, the second reflective material reflecting a second color of light through the second subarea, the first color of light and the second color of light being different.

18. The electronic device of claim 17, the first color of light comprising more green light and more blue light than the second color of light.

19. The electronic device of claim 16, the optically pellucid electrical conductor defining a light transmission function of light wavelength, the first reflective material defining a light reflection function of the light wavelength, the light absorption function defining a horizontal reflection function of the light reflection function.

20. The electronic device of claim 16, the first reflective material reflecting light through the first subarea along an axis normal to a major surface of the fascia.

* * * * *